(12) United States Patent
Lan et al.

(10) Patent No.: US 9,351,287 B2
(45) Date of Patent: May 24, 2016

(54) METHOD FOR TRANSMITTING UPLINK RESPONSE SIGNAL, TERMINAL EQUIPMENT AND BASE STATION

(71) Applicant: FUJITSU LIMITED, Kawasaki-shi, Kanagawa (JP)

(72) Inventors: Yuanrong Lan, Beijing (CN); Yuantao Zhang, Beijing (CN); Hua Zhou, Beijing (CN); Jianming Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 325 days.

(21) Appl. No.: 13/865,465

(22) Filed: Apr. 18, 2013

(65) Prior Publication Data
US 2013/0242913 A1 Sep. 19, 2013

Related U.S. Application Data

(63) Continuation of application No. PCT/CN2010/077870, filed on Oct. 19, 2010.

(51) Int. Cl.
*H04L 5/00* (2006.01)
*H04W 72/04* (2009.01)

(52) U.S. Cl.
CPC ........... *H04W 72/0413* (2013.01); *H04L 5/001* (2013.01); *H04L 5/003* (2013.01)

(58) Field of Classification Search
None
See application file for complete search history.

(56) References Cited

U.S. PATENT DOCUMENTS

| | | | |
|---|---|---|---|
| 2009/0196204 A1* | 8/2009 | Astely | H04L 1/1635 370/280 |
| 2011/0002276 A1* | 1/2011 | Chen | H04W 72/0413 370/329 |

FOREIGN PATENT DOCUMENTS

| | | |
|---|---|---|
| CN | 101789851 | 7/2010 |
| CN | 101854662 | 10/2010 |
| WO | 2010/074490 | 7/2010 |

OTHER PUBLICATIONS

International search report issued for corresponding International Patent Application No. PCT/CN2010/077870, mailed Jul. 28, 2011 with English translation.
First Notification of Office Action issued by the State Intellectual Property Office of China for corresponding Chinese Patent Application No. 201080069656.9, dated Apr. 24, 2015, with an English translation.

* cited by examiner

*Primary Examiner* — Hassan Phillips
*Assistant Examiner* — Ayanah George
(74) *Attorney, Agent, or Firm* — Myers Wolin, LLC

(57) ABSTRACT

A method includes receiving downlink data transmitted by a base station via a primary and secondary component carrier in a predetermined order; detecting the received downlink data to obtain indication information on correctly receiving and wrongly receiving the downlink data, or no control information received, allocating corresponding uplink resources according to the primary and secondary component carrier where the detected downlink data is present; arranging the indication information obtained through detecting according to the order of transmitting the downlink data by the base station to obtain an indication information sequence; generating an uplink response signal and determining the uplink resources used to feed back the uplink response signal; transmitting the uplink response signal to the base station using the determined uplink resources, so the base station determines the downlink data retransmitted according to the uplink response signal fed back in the uplink resources, enabling the BS avoid unnecessary data retransmission.

37 Claims, 22 Drawing Sheets

| Uplink-downlink Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

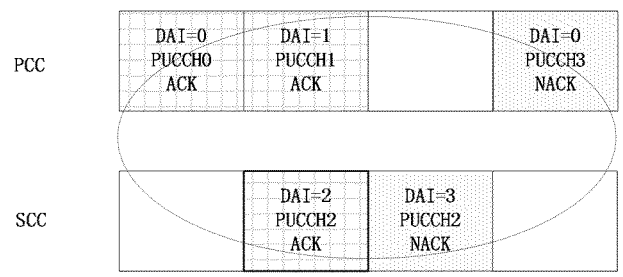
Fig. 22
| DAI=0<br>PUCCH0<br>ACK | DAI=1<br>PUCCH1<br>ACK | DAI=2<br>PUCCH2<br>ACK | DAI=3<br>PUCCH2<br>NACK | DAI=0<br>PUCCH3<br>NACK |
Fig. 23
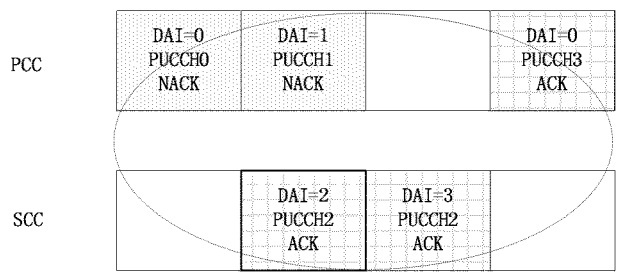
Fig. 24
| DAI=0<br>PUCCH0<br>NACK | DAI=1<br>PUCCH1<br>NACK | DAI=2<br>PUCCH2<br>ACK | DAI=3<br>PUCCH2<br>ACK | DAI=0<br>PUCCH3<br>ACK |
Fig. 25

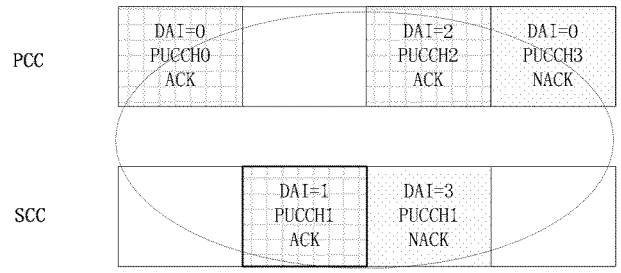
Fig. 30
| DAI=0 PUCCH0 ACK | DAI=1 PUCCH1 ACK | DAI=2 PUCCH2 ACK | DAI=3 PUCCH1 NACK | DAI=0 PUCCH3 NACK |
Fig. 31
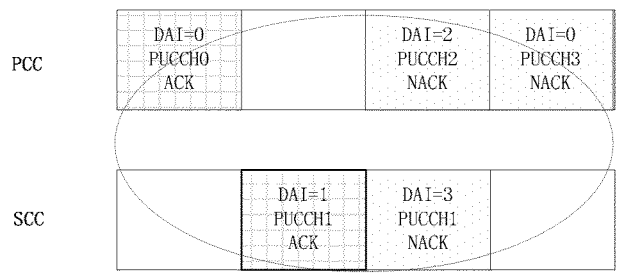
Fig. 32
| DAI=0 PUCCH0 ACK | DAI=1 PUCCH1 ACK | DAI=2 PUCCH2 NACK | DAI=3 PUCCH1 NACK | DAI=0 PUCCH3 NACK |
Fig. 33

METHOD FOR TRANSMITTING UPLINK RESPONSE SIGNAL, TERMINAL EQUIPMENT AND BASE STATION

CROSS-REFERENCE TO RELATED APPLICATIONS

The present application is a continuation of PCT Application No. PCT/CN2010/077870, filed on Oct. 19, 2010, the contents of which are herein wholly incorporated by reference.

TECHNICAL FIELD

The present invention relates to the field of wireless communication, and in particular to a method for transmitting uplink response signal, terminal equipment and base station.

BACKGROUND ART

In a long-term evolution (LTE) system, a user equipment (UE) receives downlink data transmitted by a base station, decodes the downlink data, obtains a response signal of the downlink data according to the result of decoding, and transmits uplink control information containing the response signal on a physical uplink control channel (PUCCH), so that the base station judges whether the data transmission is correct or wrong according to the uplink control information and hence judges whether data retransmission is needed. Wherein, the uplink control information comprises response signals for uplink data, such as acknowledgement (ACK)/negative acknowledgement (NACK)/discontinuous transmission (DTX), and channel state information (CSI), etc., wherein the ACK denotes that the data are correctly received, NACK denotes that the data are wrongly received, and DTX denotes that the UE receives no downlink control data, that is, receives no control signaling for scheduling downlink data transmission.

The response signals transmitted in the PUCCH correspond respectively to a physical channel resource, a time domain sequence and a frequency domain sequence.

FIG. 1 is a schematic diagram of resource assignment in a carrier aggregation (CA) system. As shown in FIG. 1, for a primary components carrier (PCC), such three resources are all associated with a first control channel element (CCE) of a physical downlink control channel (PDCCH) for scheduling the downlink data and to which the response signals correspond. And for a secondary components carrier (SCC), the PUCCH resources are explicitly indicated by ACK_NACK resource indicators (ARIs) in the PDCCH.

Wherein, a base station (BS) transmits a list of usable PUCCH to a UE via a radio resource control (RRC) protocol, the list comprising corresponding relations between states indicated by the ARIs and the PUCCH resources. For example, several PUCCH resources may be included, such as {PUCCH0, PUCCH1, PUCCH2, PUCCH3}, where, ARI=01 corresponds to resource PUCCH1, and ARI=11 corresponds to resource PUCCH3. In this way, the UE may select corresponding PUCCH resources according to the values of the ARIs. For example, when ARI=01, PUCCH1 is selected, and when ARI=11, PUCCH3 is selected. Wherein, as PDCCH in an SCC contains 2 bits of ARI, the 2 bits can only indicate four states, and it is impossible to select one PUCCH among N PUCCHs prepared for explicit allocation.

For an time division duplex (TDD) system of LTE system (LTE TDD system), in many cases, an uplink (UL) subframe corresponds to multiple downlink (DL) subframes, that is, for any UE in the system, an uplink subframe needs to transmit values of response signals of multiple downlink subframes corresponding to the uplink subframe.

FIG. 2 is a schematic diagram of the available configuration manner in an LTE TDD system. As shown in FIG. 2, the number of the downlink subframes is different from that of the uplink subframes in one frame. Taking configuration2 as an example, there exist 8 downlink subframes (since uplink control information cannot be transmitted in S, S is deemed as a downlink) and 2 uplink subframes, each of the uplink subframes being responsible for feedback of response signals (ACK/NACK) of 4 downlink subframes.

For a CA TDD system, at most 5 uplink CCs and 5 downlink CCs may be used, and if configuration2 shown in FIG. 2 is used and each of the uplink subframes is responsible for 4 downlink subframes, then each uplink CC needs to feed back the ACK/NACK of at most 5 downlink CCs, that is, the ACK/NACK of total 40 physical downlink shared channels (PDSCHs) (if a CC transmits two code words in a subframe, two ACK/NACK bits are needed, that is, 2×5×4=40). In an uplink, it is substantially impossible to feed back all these bits.

At present, the above problem may be solved by an ACK/NACK bundling. FIG. 3A is a schematic diagram of the full bundling used in a CA TDD system, and FIG. 3B is a schematic diagram of the time domain bundling used in a CA TDD system.

As shown in FIGS. 3A and 3B, downlink assignment indicators (DAIs) exist in a PDCCH, and there are two potential counting functions:

1) accumulated at current moment number of PDCCHs that have been transmitted at the BS side. For example, when the BS transmits a first PDCCH, 0 is tagged on the first PDCCH, and when a second PDCCH is transmitted, 1 is tagged on the second PDCCH, and so on. If the UE detects PDCCH0 and PDCCH2 successfully, according to the tag on the PDCCHs, it may be known that PDCCH1 is missed. And although the detected downlink data are all ACK, but the UE feeds back NACK since it knows that one PDCCH is missed in detection.

2) the total number of transmitted PDCCHs is recorded.

As shown in FIG. 3A, in full bundling, the DAI values are accumulatively counted taking CC first and then subframe into consideration; and as shown in FIG. 3B, in time domain bundling, the DAIs are effective in each subframe in a CC, and an accumulated number is counted.

As shown in FIGS. 3A and 3B, manners of PUCCH resource allocation on PCC and SCC are as follows:

in the PCC, resources are implicitly mapped, and in this way, the PUCCHs to which each subframe in the PCC corresponds are different; in the SCC, resources are explicitly mapped, and in this way, the PUCCHs to which each subframe in the SCC corresponds may be different, and may also be identical, depending on whether the ARIs are identical or not. For the time domain bundling, identical resources may be allocated, such as PUCCH2 shown in FIG. 3B. Hence, uplink PUCCH resources may be saved when the time domain bundling is used.

In the full bundling manner shown in FIG. 3A, the UE detects the downlink data received from the PCC and SCC and obtains detection results (ACK/NACK), performs an AND operation on all the detection results, and then transmits the results (ACK/NACK) after the AND operation on the PUCCH to which the last received PDCCH corresponds.

In the time domain bundling manner shown in FIG. 3B, the UE performs an AND operation on the detection result (ACK/

NACK) of each subframe in the same CC, and then feeds back the bundled results to the BS by using channel selection.

In the implementation of the present invention, the inventors found that following problems need to be solved in bundling:

1) the problem of missed detection of a downlink data which is not the last one: at present, the missed detection may be found by using DAIs; and
2) the problem of missed detection of the last downlink data: at present, whether the last downlink data is missed in detection is checked by feeding back ACK/NACK in the PUCCH to which the last received PDCCH corresponds.

The problem of missed detection in full bundling is illustrated below with reference to FIGS. 4 and 5.

Example 1: as shown in FIG. 4, on the PCC, the BS transmits 3 PDSCHs, the UE detects one PDSCH (DAI=0, PUCCH0), and the detection result is correct (feed back ACK). And on the SCC, the BS transmits 2 PDSCHs, the UE detects two PDSCHs (DAI=2, PUCCH2; DAI=3, PUCCH3), and the detection result is correct (feed back ACK).

In full bundling, the UE receives the PDCCHs with DAI numbers 0 and 2, but does not receive a PDCCH with a DAI number 1. Hence, the UE may know that missed detection occurs and feed back NACK on PUCCH3 to which the last received PDCCH corresponds, and the BS retransmits all the data after receiving the NACK.

Example 2: as shown in FIG. 5, on the PCC, the BS transmits 3 PDSCHs, the UE detects two PDSCHs respectively corresponding to DAI=0, PUCCH0 and DAI=1, PUCCH1, and the detection result is correct (feed back ACK). And on the SCC, the BS transmits 2 PDSCHs, the UE detects two PDSCHs respectively corresponding to DAI=2, PUCCH2 and DAI=3, PUCCH3, and the detection result is correct (feed back ACK).

In full bundling, since no case of skip of DAI numbers is found, the UE does not know that missed detection occurs in the last transmitted PDSCH, and feeds back ACK on the PUCCH3 to which the last received PDCCH corresponds, and the BS detects the ACK on the PUCCH3, knows that missed detection occurs in the last PDCCH (DAI=4, PUCCH4), and retransmits the last PDSCH.

It can be seen from above that the missed detection of the last PDCCH induces the following problems:

1) if the UE does not feed back ACK/NACK on the PUCCH to which the last received PDCCH corresponds, the BS is unable to know whether the UE receives all the PDCCHs and all the PDCCHs are correctly received, or the last PDCCH is missed in detection and the former 4 PDCCHs are correctly received;
2) in full bundling, the problem of 1) is well solved by feeding back ACK/NACK on the PUCCH to which the last received PDCCH corresponds; however, in the time domain bundling, such a problem still exists.

FIG. 6 is a schematic diagram showing the occurrence of missed detection in time domain bundling.

As shown in FIG. 6, the bundling result obtained by the UE is (ACK, ACK), and if one QPSK symbol is used to denote an (ACK, ACK) state and a PUCCH to which the last PDCCH detected in the SCC detection corresponds is used in feedback, the BS may know that the last PDCCH in the SCC is missed in detection, but is unable to know whether all the PDCCHs in the PCC are detected and all the PDCCHs are correctly received, or the last PDCCH is missed in detection and all the detected PDCCHs are correctly received. On the contrary, if the PUCCH to which the last detected PDCCH in the PCC corresponds is used, the same problem will occur in the SCC.

In summary, in the implementation of the present invention, the inventors found that following defect exists in the bundling technology of the prior art: in a CA TDD system, in the full bundling, many correctly received data are retransmitted, as shown in FIG. 4; and in the time domain bundling, there is no way to solve the problem of missed detection of the last PDCCH till now.

SUMMARY OF THE INVENTION

The object of the embodiments of the present invention is to provide a method for transmitting uplink response signal, terminal equipment and BS, which may avoid unnecessary retransmission in full bundling, and solve the problem of missed detection of the last PDCCH in time domain bundling.

An aspect of the embodiments of the present invention provides a method for transmitting uplink response signal, comprising:

receiving downlink data transmitted by a BS via at least one downlink subframe of a primary component carrier and a secondary component carrier in a predetermined order;

detecting the received downlink data to obtain indication information on correctly receiving the downlink data, wrongly receiving the downlink data, or no control information being received, and to allocate corresponding uplink resources according to the primary component carrier and secondary component carrier where the detected downlink data is present;

arranging the indication information obtained through detecting according to the order of transmitting the downlink data by the BS to obtain an indication information sequence;

generating an uplink response signal according to the indication information in the indication information sequence obtained at the corresponding secondary component carrier and the position and number of the correctly received indication information in the indication information sequence, and determining the uplink resources used to feed back the uplink response signal; and transmitting the uplink response signal to the BS by using the determined uplink resources, such that the BS determines the downlink data needing to be retransmitted according to the uplink response signal.

Another aspect of the embodiments of the present invention provides a method for transmitting uplink response signal, comprising:

transmitting downlink data by a BS via at least one downlink subframe of a primary component carrier and a secondary component carrier to terminal equipment in a predetermined order;

retransmitting selectively the downlink data by the BS according to an uplink response signal fed back on the uplink resource if the BS receives the uplink response signal on the uplink resource fed back by the terminal equipment; and retransmitting all the downlink data by the BS if the BS receives no uplink response signal fed back by the terminal equipment.

A further aspect of the embodiments of the present invention provides terminal equipment, comprising:

a first receiving unit for receiving downlink data transmitted by a BS via a primary component carrier and a secondary component carrier in a predetermined order;

a first processing unit for detecting the downlink data received by the first receiving unit to obtain indication information on correctly receiving the downlink data, wrongly receiving the downlink data, or no control information being received, and to allocate corresponding uplink resources according to the primary component carrier and secondary component carrier where the detected downlink data is present;

an arranging unit for arranging the indication information obtained through detecting the processing unit according to the order of transmitting the downlink data by the BS to obtain an indication information sequence;

a signal generating and resource determining unit for generating an uplink response signal according to the indication information in the indication information sequence obtained at the corresponding secondary component carrier and the position and number of the correctly received indication information in the indication information sequence, and for determining the uplink resources used to feed back the uplink response signal; and a signal transmitting unit for transmitting the uplink response signal to the BS by using the uplink resources determined by the signal generating and resource determining unit, such that the BS determines the downlink data needing to be retransmitted according to the uplink response signal.

A still aspect of the embodiments of the present invention provides a BS, comprising:

a first transmitting unit for transmitting downlink data to terminal equipment via a primary component carrier and a secondary component carrier in a predetermined order;

a third determining unit for determining whether the uplink response signal fed back through the indication information sequence is received in the uplink resource, the indication information sequence is obtained through the terminal equipment detecting the downlink data transmitted by the first transmitting unit, and the indication information sequence containing indication information on correctly receiving the downlink data, wrongly receiving the downlink data, or no control information being received; and a first retransmitting unit for retransmitting selectively the downlink data according to the uplink response signals fed back in the uplink resource when it is determined by the third determining unit that the uplink response signals are received in the uplink resource.

A further still aspect of the embodiments of the present invention provides a communication system comprising the above-described BS and terminal equipment.

A further still aspect of the embodiments of the present invention provides a method for transmitting uplink response signal, comprising:

receiving downlink data transmitted by a BS via a primary component carrier and a secondary component carrier in a predetermined order;

detecting the received downlink data to obtain indication information on correctly receiving the downlink data, wrongly receiving the downlink data, or no control information being received, and downlink assignment indicator DAI values indicative of the order of the downlink data transmitted at the primary component carrier and the secondary component carrier;

performing time domain bundling on the detection results at the primary component carrier and the secondary component carrier, respectively;

determining used modulation symbol according to the last downlink assignment indicator DAI value detected at the secondary component carrier and a mapping relation between a preset downlink assignment indicator DAI value, the bundling result at the secondary component carrier and the modulation symbol; or determining the used modulation symbol according to the last downlink assignment indicator DAI value corresponding to the last correctly received indication information in the correctly received indication information successively detected at the secondary component carrier and the mapping relation between a preset downlink assignment indicator DAI value, the bundling result at the secondary component carrier and the modulation symbol;

determining the uplink resource for transmitting the modulation symbol according to the obtained bundling result and the mapping relation between a preset bundling result and the modulation symbol and the uplink resource; the uplink resource representing the uplink resource corresponding to the last correctly received indication information in the correctly received indication information successively detected at the primary component carrier or the secondary component carrier; and transmitting the modulation symbol in the determined uplink resource to the BS, such that the BS retransmits selectively the downlink data according to the modulation symbol received in the uplink resource.

A further still aspect of the embodiments of the present invention provides a method for transmitting uplink response signal, comprising:

transmitting downlink data to terminal equipment by a BS via a primary component carrier and a secondary component carrier in a predetermined order;

determining a downlink assignment indicator DAI value by the BS according to modulation symbol and mapping relation between a preset downlink assignment indicator DAI value and bundling result at the secondary component carrier and the modulation symbol, if the BS receives the modulation symbol in the uplink resource fed back by the terminal equipment according to the detection of the received downlink data;

wherein the downlink assignment indicator DAI value represents the last downlink assignment indicator DAI value detected by the terminal equipment at the secondary component carrier, or represents the downlink assignment indicator DAI value corresponding to the last correctly received indication information in the correctly received indication information successively detected by the terminal equipment at the secondary component carrier; and the uplink resource represents the uplink resource corresponding to the last correctly received indication information in the correctly received indication information successively detected at the primary component carrier or the secondary component carrier; and retransmitting selectively the downlink data by the BS according to the determined downlink assignment indicator DAI value and the uplink resource.

A further still aspect of the embodiments of the present invention provides terminal equipment, comprising:

a second receiving unit for receiving downlink data transmitted by a BS via a primary component carrier and a secondary component carrier in a predetermined order;

a second processing unit for detecting the downlink data received by the second receiving unit to obtain indication information on correctly receiving the downlink data, wrongly receiving the downlink data, or no control information being received, and to obtain a downlink assignment indicator DAI value indicative of the order of transmitting the downlink data at the primary component carrier and the secondary component carrier;

a bundling unit for performing time domain bundling to the results of detecting at the primary component carrier and the secondary component carrier, respectively;

a first symbol determining unit for determining used modulation symbol according to the last downlink assignment indicator DAI value detected at the secondary component carrier and a mapping relation between a preset downlink assignment indicator DAI value and the bundling result at the secondary component carrier and the modulation symbol; or for determining the used modulation symbol according to the last downlink assignment indicator DAI value corresponding to the last correctly received indication information in the correctly received indication information successively detected at the secondary component carrier and the mapping relation between a preset downlink assignment indicator DAI value and the bundling result at the secondary component carrier and the modulation symbol;

a resource determining unit for determining the uplink resource for transmitting the modulation symbol according to the bundling result obtained by the bundling unit and the mapping relation between a preset bundling result and the modulation symbol and the uplink resource; the uplink resource representing the uplink resource corresponding to the last correctly received indication information in the correctly received indication information successively detected at the primary component carrier or the secondary component carrier; and a second transmitting unit for transmitting the modulation symbol to the BS in the determined uplink resource, such that the BS retransmits selectively the downlink data according to the modulation symbol received at the uplink resource.

A further still aspect of the embodiments of the present invention provides a BS, comprising:

a second transmitting unit for transmitting downlink data to terminal equipment via a primary component carrier and a secondary component carrier in a predetermined order;

a second indication value determining unit for determining a downlink assignment indicator DAI value according to a modulation symbol and mapping relation between a preset downlink assignment indicator DAI value and bundling result at the secondary component carrier and the modulation symbol when the modulation symbol fed back by the terminal equipment according to the detection of the received downlink data is received in the uplink resource;

wherein the downlink assignment indicator DAI value represents the last downlink assignment indicator DAI value detected by the terminal equipment at the secondary component carrier, or represents the downlink assignment indicator DAI value corresponding to the last correctly received indication information in the correctly received indication information successively detected by the terminal equipment at the secondary component carrier; and the uplink resource represents the uplink resource corresponding to the last correctly received indication information in the correctly received indication information successively detected at the primary component carrier or the secondary component carrier; and a second retransmitting unit for retransmitting selectively the downlink data according to the downlink assignment indicator DAI value determined by the second indication value determining unit and the uplink resource.

A further still aspect of the embodiments of the present invention provides a communication system comprising the above-described BS and terminal equipment.

A further still aspect of the embodiments of the present invention provides a computer-readable program, wherein when the program is executed in a BS, the program enables a computer to execute the method for transmitting uplink response signal as described above in the BS.

A further still aspect of the embodiments of the present invention provides a storage medium in which a computer-readable program is stored, wherein the computer-readable program enables a computer to execute the method for transmitting uplink response signal as described above in a BS.

A further still aspect of the embodiments of the present invention provides a computer-readable program, wherein when the program is executed in terminal equipment, the program enables a computer to execute the method for transmitting uplink response signal as described above in the terminal equipment.

A further still aspect of the embodiments of the present invention provides a storage medium in which a computer-readable program is stored, wherein the computer-readable program enables a computer to execute the method for transmitting uplink response signal as described above in terminal equipment.

The advantages of the embodiments of the present invention exist in that unnecessary retransmission in full bundling may be avoided by arranging the detection results on a PCC and SCC and generating uplink response signals according to pre-established rules; and the problem of missed detection of a last PDCCH in time domain bundling may be solved by determining modulation symbols transmitted in time domain bundling and uplink resources for transmitting the modulation symbols through a preset mapping relation.

Particular embodiments of the invention have been disclosed in detail with reference to the following description and drawings and are indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

FIGS. 22 and 23 are schematic diagrams of application example 6 of embodiment 3 of the present invention;

FIGS. 24 and 25 are schematic diagrams of application example 7 of embodiment 3 of the present invention;

FIGS. 30 and 31 are schematic diagrams of application example 10 of embodiment 3 of the present invention;

FIGS. 32 and 33 are schematic diagrams of application example 11 of embodiment 3 of the present invention;

DETAILED DESCRIPTION OF THE INVENTION

The preferred embodiments of the present invention are described as follows with reference to the drawings. These embodiments are illustrative only and are not intended to limit the present invention. For the easy understanding of the principle and embodiments of the present invention by those skilled in the art, the embodiments of the present invention shall be described taking a CA TDD system as an example, with terminal equipment being a UE. However, it should be understood that the present invention is not limited thereto.

Embodiment 1

Figure 7:
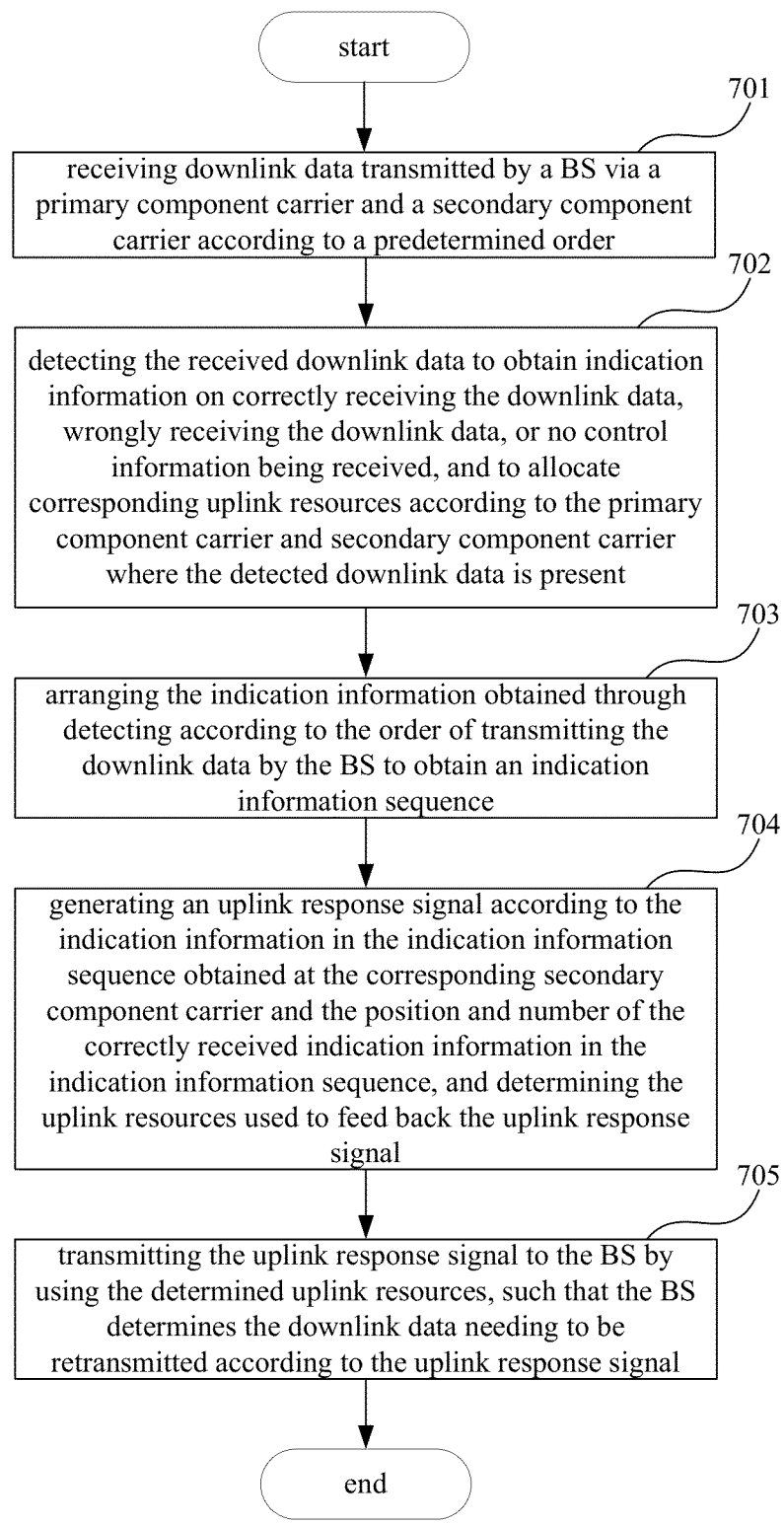
FIG. 7 is a flowchart of the method for transmitting uplink response signal of embodiment 1 of the present invention.

An embodiment of the present invention provides a method for transmitting uplink response signal. As shown in FIG. 7, the method comprises:

step 701: receiving downlink data transmitted by a BS via a primary component carrier and a secondary component carrier in a predetermined order;

step 702: detecting the received downlink data to obtain indication information on correctly receiving the downlink data, wrongly receiving the downlink data, or no control information being received, and to allocate corresponding uplink resources according to the primary component carrier and secondary component carrier where the detected downlink data is present;

step 703: arranging the indication information obtained through detecting according to the order of transmitting the downlink data by the BS to obtain an indication information sequence;

step 704: generating an uplink response signal according to the indication information in the indication information sequence obtained at the corresponding secondary component carrier and the position and number of the correctly received indication information in the indication information sequence, and determining the uplink resources used to feed back the uplink response signal; and step 705: transmitting the uplink response signal to the BS by using the determined uplink resources, such that the BS determines the downlink data needing to be retransmitted according to the uplink response signal.

Figure 4:
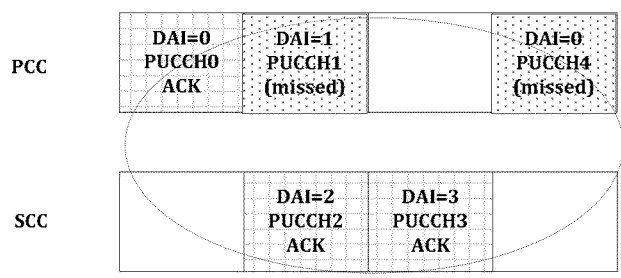
FIGS. 4 and 5 are schematic diagrams showing the occurrence of missed detection in full bundling.
Figure 5:
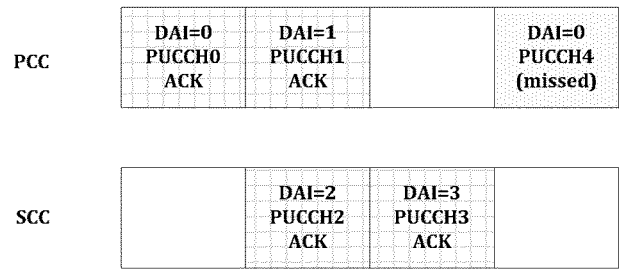

In this embodiment, when the BS transmits the downlink data in a predetermined order, a DAI value transmitted in a PDCCH may be used to represent the order. It can be seen from the background art that the DAI value is used for recording the number of the PDCCHs accumulatively transmitted by the BS, and the DAI may be in an order of 0, 1, 2 . . . , etc. In full bundling, the DAI values are accumulatively counted taking CC first and then subframe into consideration. For example, as shown in FIG. 4, the BS counts at a first subframe of a PCC and a SCC, and if the BS transmits data only at the PCC, then DAI=0; and then the BS counts at a second subframe of the PCC and SCC, and if the BS transmits data at both the PCC and the SCC, then DAI=1 at the PCC and DAI=2 at the SCC, and so on. In this embodiment, it is not limited to the above manner, and other manners may be used for indicating the orders of transmission.

In this embodiment, in step 702, the step of detecting the received downlink data to obtain indication information on correctly receiving the downlink data, wrongly receiving the downlink data, or no control information being received, specifically comprises: decoding the received downlink data, and determining that the downlink data is correctly received, wrongly received, or no control information is received, according to the decoding result; wherein the indication information on correctly receiving the downlink data may be ACK, the indication information on wrongly receiving the downlink data may be NACK, and the indication information on no control information being received may be DTX.

Figures 1, 2:
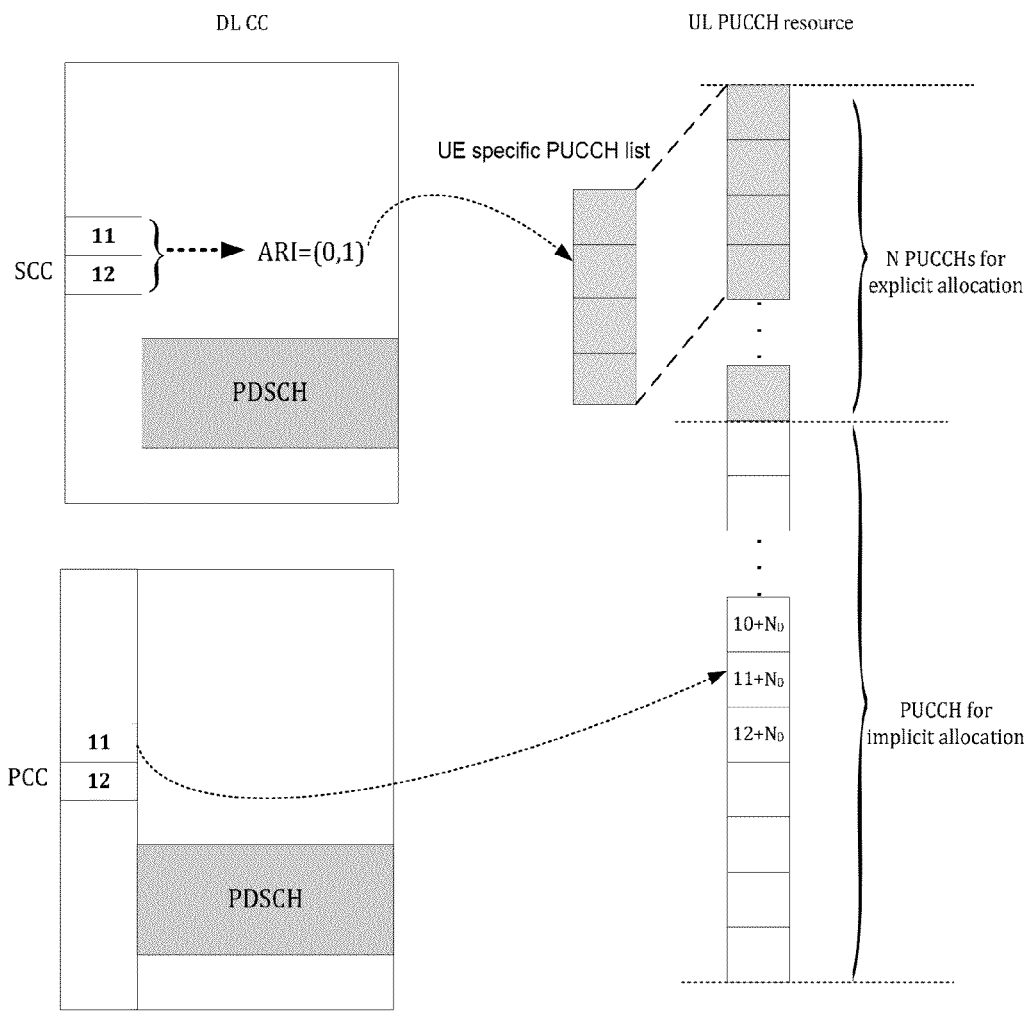
FIG. 1 is a schematic diagram of resource allocation in a carrier aggregation system of the prior art.
FIG. 2 is a schematic diagram of the available configuration in an LTE TDD system.
Figure 3A:
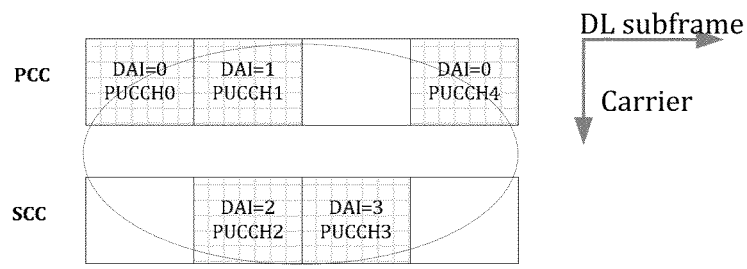
FIG. 3A is a schematic diagram of full bundling used in a CA TDD system.
Figure 3B:
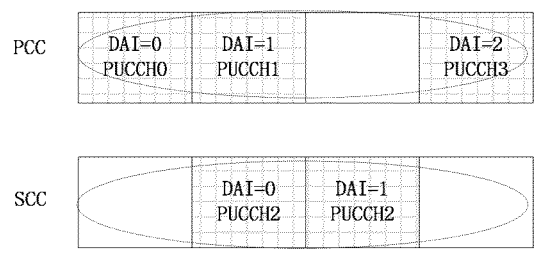
FIG. 3B is a schematic diagram of time domain bundling used in a CA TDD system.

Furthermore, in step 702, the step of allocating corresponding uplink resources according to the primary component carrier and secondary component carrier where the detected downlink data is present can be achieved by using the method described in the background art and shown in FIG. 1, wherein implicit allocation may be used for the PCC, and explicit allocation may be used for the SCC. Detailed methods for uplink resource allocation are as described in the background art, which shall not be described any further. Wherein the uplink resources may be PUCCHs; however, this is just an embodiment of the present invention.

In this way, after the above steps, the UE may obtain detection result of the downlink data, such as ACK, NACK, DTX and transmit corresponding PUCCHs; and the BS transmits the DAI values via the PDCCHs.

Figure 8:
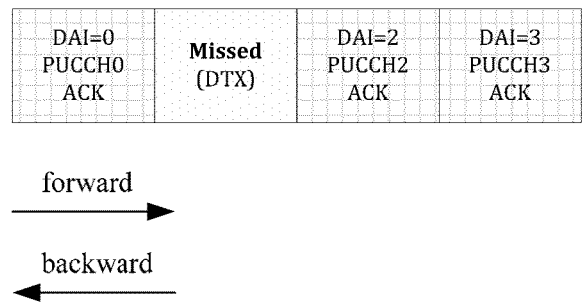
FIGS. 8 and 9 are diagrams showing the examples of arranging the detection results according to the DAI values of embodiment 1 of the present invention.

In this embodiment, in step 703, the UE may arrange the detection results according to the DAI values transmitted by the BS, so as to obtain an indication information sequence. For example, the detection results are as shown in FIG. 4, and the indication information sequence obtained by arranging according to the DAIs is as shown in FIG. 8.

In the prior art, if the UE knows that the downlink data to which DAI=1 corresponds is missed in detection, even if the detection results of the downlink data to which DAI=0, 2, 3 correspond are all ACK, the bundling result is also NACK. Therefore, the UE still feeds back NACK to the BS, and when the BS receives NACK, it retransmits all the downlink data, resulting in unnecessary data retransmission, and lowering efficiency of data transmission.

In the embodiment of the present invention, in step 704, an uplink response signal is generated, according to the indication information in the indication information sequence obtained at the corresponding secondary component carrier, and the position and number of the correctly received indication information in the indication information sequence, and the uplink resources used to feed back the uplink response signal are determined.

Wherein, different from the prior art, the generated uplink response signal is used to denote a direction, indicating that the detection results of the downlink data in the direction indicated by the uplink response signal are ACK. Therefore, when the BS receives the uplink response signal in the uplink resource, it may determine the downlink data that are correctly received by the UE, thereby determining the downlink data needing to be retransmitted, and avoiding unnecessary data retransmission.

A case shall be described below where the number of indication information obtained on the SCC is 1, or the number of indication information is greater than 1 and the allocated uplink resources are different. Other cases shall be described later in example 3.

Assuming that the direction from the first piece of indication information to the last piece of indication information denotes a forward direction, and the reverse direction is a backward direction, and following description is given taking the above directions as an example; however, this is an embodiment only, and vise versa.

The uplink response signal generated in step 704 may be an indication signal indicative of the forward direction, and the indication signal in the forward direction indicates that the downlink data related to successive N pieces of correctly received indication information are correctly received, the N pieces of correctly received indication information starting from the indication information that is received correctly at the beginning and ending at the last indication information that is received correctly in the forward direction, and N being a positive integer greater than or equal to 1; wherein the indication information that is received correctly at the beginning refers to the indication information indicating that the detection result of the first downlink data transmitted by the BS is that the downlink data is correctly received, that is, the detection result of the PDSCH with DAI=0 is ACK, as shown in FIG. 8; in the indication information sequence, the indication information at the starting position is indication information ACK indicating that the downlink data is correctly received and DAI=0, then an indication signal in the forward direction is generated, such as ACK, indicating that the downlink data to which DAI=0 corresponds is received correctly, and the used uplink resource is determined as the uplink resource to which the last correctly received indication information in the forward direction corresponds, which is PUCCH0, as shown in FIG. 8. In this way, when the BS receives the indication information ACK in the forward direction on the PUCCH0, it may determine that the downlink data to which DAI=0 corresponds is received correctly, and the downlink data to which DAI=0 corresponds needs not to be retransmitted.

Figure 9:
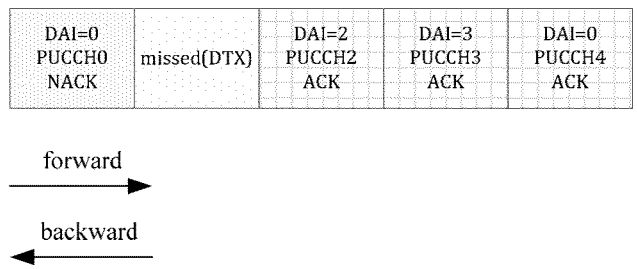

The uplink response signal generated in step 704 may be an indication signal indicative of the backward direction, and the indication signal in the backward direction indicates that the downlink data related to successive M pieces of correctly received indication information are correctly received, the M pieces of correctly received indication information starting from the indication information that is received correctly at the ending position and ending at the last correctly received indication information in the backward direction in the backward direction, and M being a positive integer greater than or equal to 1; wherein the ending position refers to the last physical position, that is, the position of the last downlink resource capable of transmitting the downlink data. In the indication information sequence shown in FIG. 9, DAI=2 and DAI=3 are on the SCC, and in the indication information sequence, the indication information at the ending position is correctly received indication information ACK, then an indication signal in the backward direction is generated, such as NACK, indicating that the downlink data to which DAI=4 to DAI=2 correspond are all received correctly, and the used uplink resource is determined as the uplink resource PUCCH2 to which the last received indication information in the backward direction corresponds. In this way, when the BS receives the indication signal NACK in the backward direction on PUCCH2, it may determine that the downlink data to which DAI=4 to DAI=2 correspond are received correctly, and the downlink data to which DAI=4 to DAI=2 correspond need not to be retransmitted. Since the position to which the last ACK corresponds is not a physical ending position as shown in FIG. 8, no indication signal in the backward direction is generated.

In the above embodiment, ACK is used to indicate an indication signal in the forward direction and NACK is used to indicate an indication signal in the backward direction. However, it is not limited thereto, and any other indication information may be used to indicate an indication signal in the forward or backward direction.

It can be seen from the above embodiment that by arranging the detection results on the PCC and SCC and generating uplink response signals indicative of directions according to the indication information obtained by detecting on SCC in the indication information sequence, and the position and number of the correctly received indication information in the indication information sequence, such that the BS may determine the correctly received downlink data after receiving the uplink response signals, and hence further determine the downlink data needing to be retransmitted. Therefore, the BS may avoid unnecessary data retransmission in full bundling and improve the efficiency of data transmission.

Embodiment 2

Figure 10:
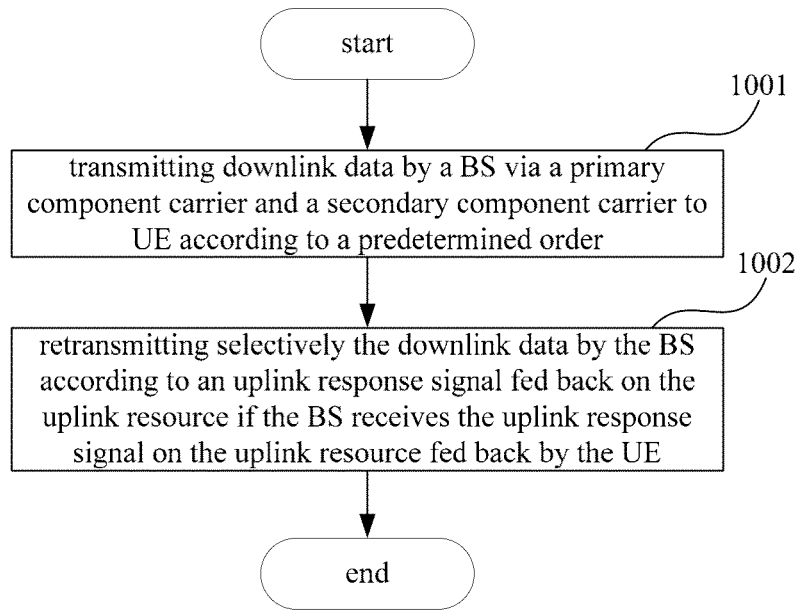
FIG. 10 is a flowchart of the method for transmitting uplink response signal of embodiment 2 of the present invention.

An embodiment of the present invention provides a method for transmitting uplink response signal. As shown in FIG. 10, the method comprises:

step 1001: transmitting downlink data by a BS via a primary component carrier and a secondary component carrier to a UE in a predetermined order; and step 1002: retransmitting selectively the downlink data by the BS according to an uplink response signal fed back on the uplink resource if the BS receives the uplink response signal fed back by the UE.

Furthermore, in this embodiment, if the BS does not receive uplink response signal fed back by the UE within a preset period, the BS retransmits all the downlink data.

In this embodiment, the uplink response signal received by the BS is as described in Embodiment 1, which may be ACK or NACK, and the meaning indicated by the response signal is as described in Embodiment 1, which shall not be described any further.

In this embodiment, in step 1001, the BS transmits downlink data via a primary component carrier and a secondary component carrier to a UE in a predetermined order; and at the user side, the UE receives and detects the downlink data, so as to obtain indication information ACK on correctly receiving the downlink data, indication information NACK on wrongly receiving the downlink data and indication information DTX on no control information being received, and obtain DAI values indicating orders of transmission; then the UE arranges the detection results according to the DAI values, so as to obtain an indication information sequence; and the UE determines a uplink response signal and an uplink resource for transmitting the uplink response signal.

In this embodiment, the direction from the first piece of indication information to the last piece of indication information denotes a forward direction, and the reverse direction is a backward direction, and following description is given taking the above directions as an example; however, this is an embodiment only, and vise versa. In this way, the UE may generate indication information ACK on correctly receiving the downlink data in the forward direction or indication information NACK on correctly receiving the downlink data in the backward direction, which is as described in Embodiment 1, and shall not be described any further.

In this embodiment, in step 1002, when the BS receives the indication information ACK on correctly receiving the downlink data in the forward direction on the uplink resources fed back by the UE, the BS may determine the downlink data transmitted via the downlink resource to which the uplink resource for transmitting the indication information ACK in the forward direction corresponds and determine the downlink data transmitted by S1 successive downlink resources following the downlink resource are all correctly received by the UE; therefore, the BS determines the downlink data transmitted via other downlink resources (not indicated by the uplink response signal) need to be retransmitted; wherein S1 is an integer greater than or equal to 1.

In this embodiment, in step 1002, when the BS receives the indication information NACK on correctly receiving the downlink data in the backward direction on the uplink resources fed back by the UE, the BS may determine the downlink data transmitted via the downlink resource to which the uplink resource for transmitting the indication information ACK in the backward direction corresponds and determine the downlink data transmitted by S2 successive downlink resources preceding the downlink resource are correctly received by the UE; therefore, the BS determines the downlink data transmitted via other downlink resources (not indicated by the uplink response signal) need to be retransmitted; wherein S2 is an integer greater than or equal to 1.

It can be seen from the above embodiment that the BS may determine the downlink data needing to be retransmitted according to the uplink response signal fed back on the uplink resource. Thus, the BS needs only to retransmit the downlink data not indicated by the uplink response signal, thereby avoiding unnecessary data retransmission in full bundling and improving the efficiency of data transmission.

Embodiment 3

Figure 11:
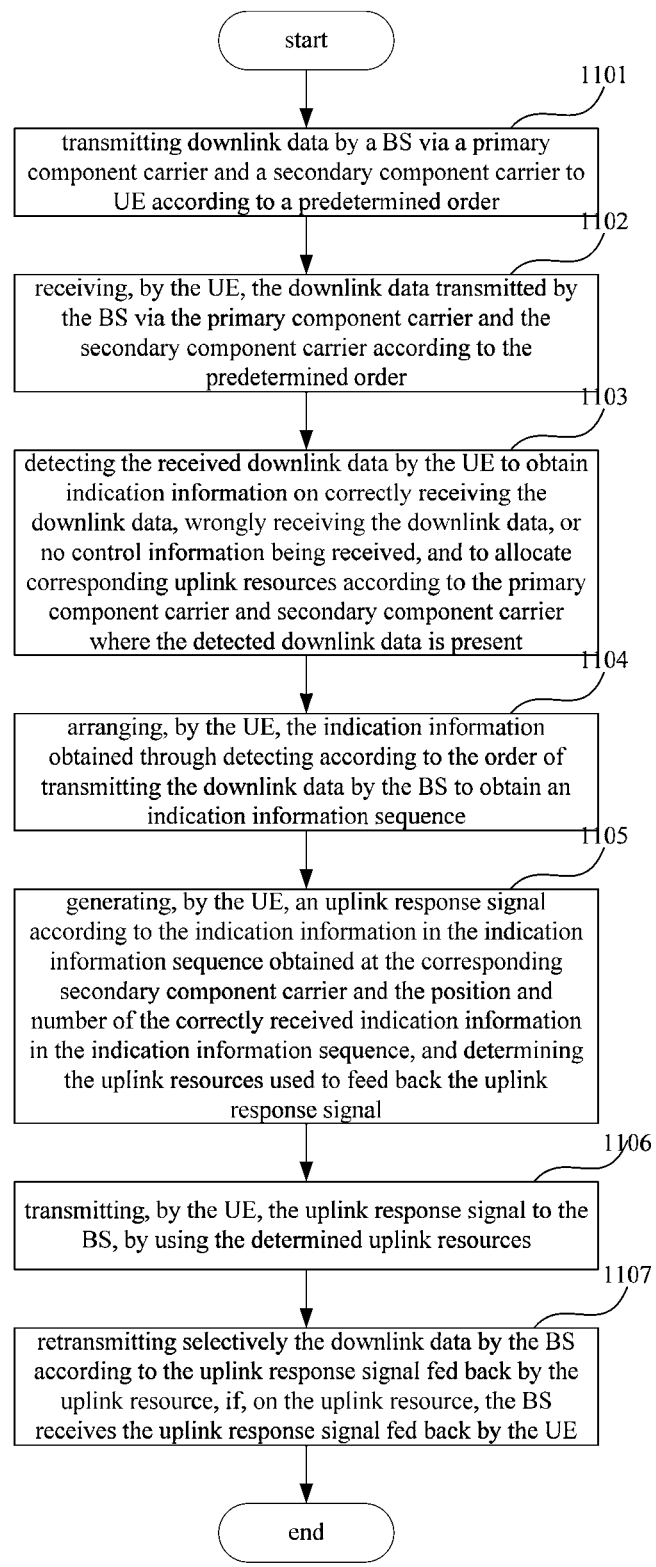
FIG. 11 is a flowchart of the method for transmitting uplink response signal of embodiment 3 of the present invention.

An embodiment of the present invention provides a method for transmitting uplink response signal. As shown in FIG. 11, the method comprises:

step 1101: transmitting downlink data by a BS via a primary component carrier and a secondary component carrier to a UE in a predetermined order;

wherein the BS transmits downlink data in a predetermined order, as described in Embodiment 1, the order of transmission may be represented by a DAI value transmitted in a PDCCH;

step 1102: receiving, by the UE, the downlink data transmitted by the BS via the primary component carrier and the secondary component carrier in the predetermined order;

step 1103: detecting the received downlink data by the UE to obtain indication information on correctly receiving the downlink data, wrongly receiving the downlink data, or no control information being received, and to allocate corresponding uplink resources according to the primary component carrier and secondary component carrier where the detected downlink data is present;

wherein the details are as described in Embodiment 1, which shall not described any further;

step 1104: arranging, by the UE, the indication information obtained through detecting according to the order of transmitting the downlink data by the BS to obtain an indication information sequence;

wherein the details are as described in Embodiment 1, which shall not described any further;

step 1105: generating, by the UE, an uplink response signal according to the indication information in the indication information sequence obtained at the corresponding secondary component carrier, and the position and number of the correctly received indication information in the indication information sequence, and determining the uplink resources used to feed back the uplink response signal;

wherein this step shall be described in detail below with reference to FIG. 12;

step 1106: transmitting, by the UE, the uplink response signal to the BS, by using the determined uplink resources; and step 1107: retransmitting selectively the downlink data by the BS according to the uplink response signal fed back via the uplink resource, if the BS receives, on the uplink resource, the uplink response signal fed back by the UE;

wherein this step is as described in Embodiment 2, which shall not described any further.

Furthermore, if the BS does not receive any uplink response signal within a preset period of time, the BS retransmits all the downlink data.

Figure 12:
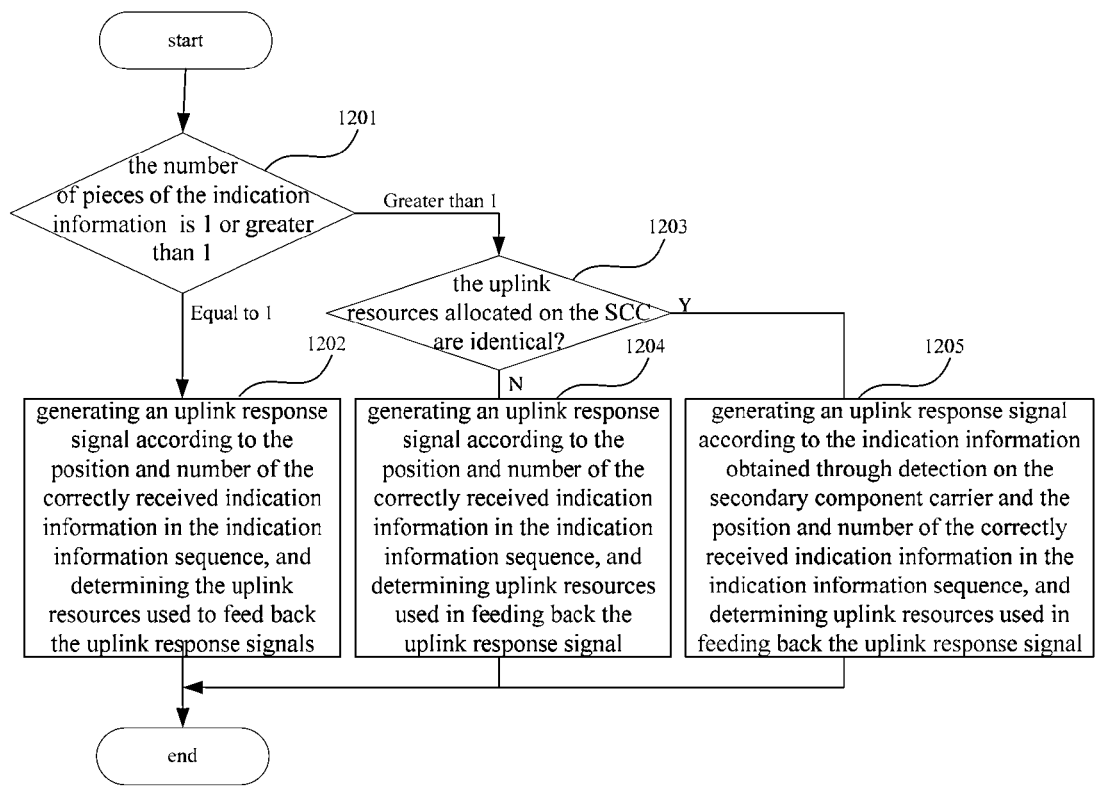
FIG. 12 is a flowchart of the implementing method of step 1005 of embodiment 3 of the present invention.

In this embodiment, FIG. 12 is a flowchart of the implementing method of step 1005 of Embodiment 3 of the present invention. As shown in FIG. 12, it comprises the steps of:

step 1201: determining that the number of the indication information in the indication information sequence obtained through detecting at the secondary component carrier is 1 or greater than 1;

step 1202: generating an uplink response signal according to the position and number of the correctly received indication information in the indication information sequence if it is determined in step 1201 that the number of the indication information obtained through detecting at the SCC is 1, and determining the uplink resources used to feed back the uplink response signals;

step 1203: further determining whether the uplink resources allocated on the SCC are identical, if it is determined in step 1201 that the number of the indication information obtained through detection at the SCC is greater than 1;

step 1204: generating an uplink response signal according to the position and number of the correctly received indication information in the indication information sequence, if it is determined in step 1203 that the allocated uplink resources are different, and determining uplink resources to be used in feeding back the uplink response signal; and step 1205: generating an uplink response signal according to the indication information obtained through detection on the SCC, and the position and number of the correctly received indication information in the indication information sequence, if it is determined in step 1203 that the allocated uplink resources are identical, and determining uplink resources to be used in feeding back the uplink response signal.

Figure 13:
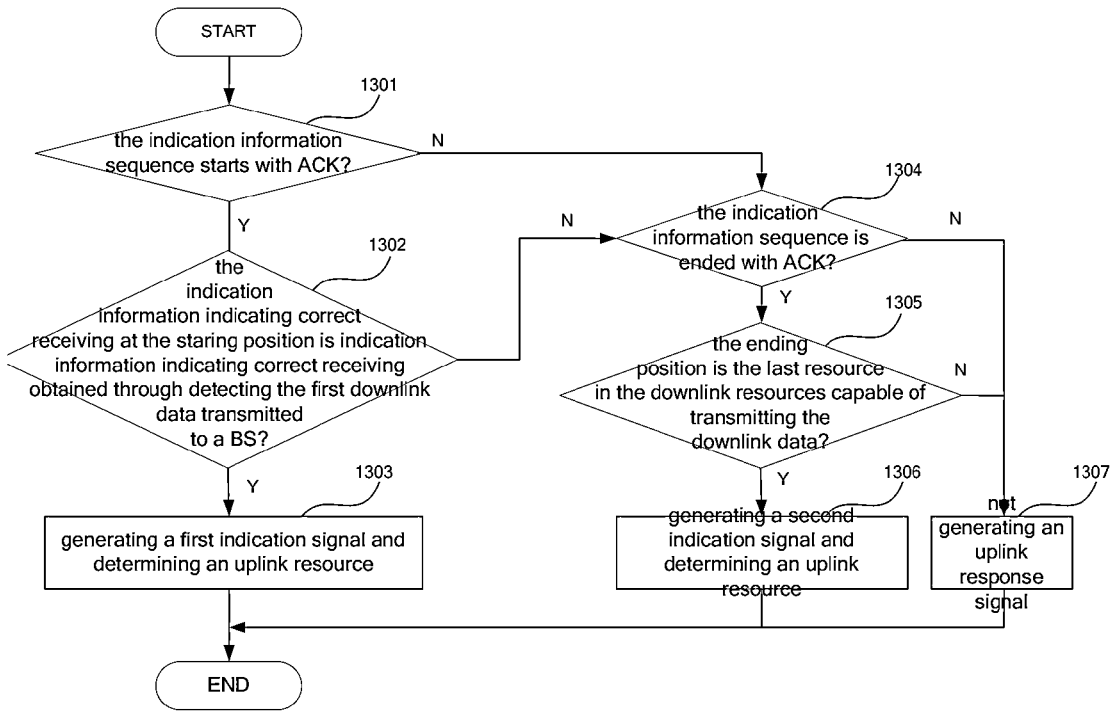
FIG. 13 is a flowchart of the implementing method of steps 1202 and 1204 of embodiment 3 of the present invention.

FIG. 13 is a flowchart of the implementing method of steps 1202 and 1204 of Embodiment 3 of the present invention. Wherein the manner of processing in full bundling for a TDD system in Rel.8 may be referred to for the manners of processing these cases, such as the method of the application No. PCT/CN2010/076603 filed on Sep. 3, 2010, the contents of which being incorporated herein by reference.

However, for the integrity and easy understanding of the present application, a brief description of the implementing method of steps 1202 and 1204 shall be given herein taking the direction from the first piece of indication information to the last piece of indication information in the indication information sequence denoting a forward direction and the reverse direction being a backward direction as an example, with reference to FIG. 13. As shown in FIG. 13, it comprises the steps of:

step 1301: determining whether the indication information sequence starts with indication information ACK indicating correct receiving, performing step 1302 if the result of determination is positive, and performing step 1304 if the result of determination is negative;

step 1302: if it is determined in step 1301 that the indication information sequence starts with the indication information ACK, determining further whether the indication information ACK indicating correct receiving at the staring position is indication information ACK indicating correct receiving obtained through detecting the first downlink data transmitted by a BS, that is, whether the downlink data with DAI=0 is correctly received, performing step 1303 if the result of determination is positive, and performing step 1304 if the result of determination is negative;

step 1303: generating a first indication signal and determining an uplink resource for feeding back the first indication signal, wherein the first indication signal is the uplink response signal and indicates that all the downlink data related to all the successive ACK in the forward direction beginning with the starting ACK are correctly received; and determining that a PUCCH to which the last ACK in at least one piece of successive ACK in the forward direction beginning with the starting ACK indicating correct receiving corresponds feeds back the first indication signal, wherein the first indication signal may be referred to as a correctly received signal in the forward direction and denoted by ACK; however, it is not limited thereto, and other indicators may also be used;

in this way, when the BS receives the correctly received signal in the forward direction on the PUCCH, it may determine that all the successive indication information (including the last piece of indication information) in the backward direction staring with the last piece of indication information are ACK; that is, the BS may know that all the downlink data related to the successive pieces of ACK are correctly received, and hence retransmits the rest downlink data that are judged as being not ACK;

step 1304: if it is determined in step 1301 that the indication information sequence is not started with ACK, determining further whether the indication information sequence is ended with ACK, and performing step 1305 if the result of determination is positive, and performing step 1307 if the result of determination is negative;

step 1305: determining whether the ending position is a physical ending position, that is, whether the resource to which the last ACK corresponds is the last resource in the downlink resources capable of transmitting the downlink data, and performing step 1306 if the result of determination is positive, and performing step 1307 if the result of determination is negative;

step 1306: generating a second indication signal and determining an uplink resource for feeding back the second indication signal, wherein the second indication signal is the uplink response signal and indicates that all the downlink data related to all the successive ACK in the backward direction beginning with the ACK at the ending position are correctly received; and determining that a PUCCH to which the last ACK in the backward direction beginning with the ACK at the ending position corresponds feeds back the second indication signal, wherein the second indication signal may be referred to as a correctly received signal in the backward direction and denoted by N; however, it is not limited thereto, and other indicators may also be used;

in this way, when the BS receives the correctly received signal in the backward direction on the PUCCH, it may determine that all the successive indication information (including the last piece of indication information) in the forward direction staring with the last piece of indication information are ACK; that is, the BS may know that all the downlink data related to the successive pieces of ACK are correctly received, and hence retransmits the rest downlink data that are not indicated by the uplink response signals; and steps 1307 and 1308: not generating an uplink response signal and not feeding back any information by the UE. Thus, the BS will retransmit all the downlink data when it does not receive response information within a predetermined period of time. In this embodiment, uplink response signals may be generated in the orders shown in FIG. 13; however, this is an embodiment of the present invention only, and in practical use of this method, the orders may be determined and judged as actually required and uplink response signals for response may be generated, such as the step of judging whether ACK is at the ending position can be performed at first, etc.

It can be seen from the above embodiment that the UE generates an uplink response signal ACK or NACK according to the position and number of the ACK in the indication information sequence (such as whether the ACK is at the start of the indication sequence (corresponding to DAI=0), whether the indication information related to the transmission blocks in the last downlink subframe of at least one downlink subframe on the PCC and SCC is ACK (i.e. a physical ending position), whether ACK are successive, and the number of successive ACK). The uplink response signal contains information indicating directions. For example, ACK represents that all the downlink data transmitted on all the successive downlink resources in the backward direction starting from the downlink resources related to the PUCCH used for transmitting the uplink response signal ACK are all correctly received, and NACK represents that all the downlink data transmitted on all the successive downlink resources in the forward direction starting from the downlink resources related to the PDCCH used for transmitting the uplink response signal NACK are correctly received. Wherein whether ACK in the indication information sequence are successive may be determined according to the DAI values, and if the DIA values are successive, ACK are successive.

In this embodiment, besides ACK and NACK, information in any other forms may be used to indicate the uplink response information, and it may be defined as actually required that different uplink response signals denote different meanings. Furthermore, the PUCCH via which an uplink response signal is transmitted may be determined according to the above-described relationship of position. For example, in this embodiment, the uplink response information is transmitted via the PUCCH to which the downlink data related to the last ACK in successive pieces of ACK corresponds. Of course, it may also be determined as actually required to use other PUCCHs to transmit the uplink response information, and it may be defined that different pieces of information will be notified to the BS by using different PUCCHs in transmission. That is, the UE may notify the BS of different pieces of information by selecting different PUCCHs and transmitting uplink response signals ACK/NACK on the different PUCCHs. Therefore, the BS may retransmit the downlink data that are not indicated by the uplink response signals according to the uplink response signals fed back by the UE, thereby avoiding unnecessary retransmission of all the data.

The methods according to the embodiments of the present invention shall be described in detail below with reference to some examples.

Example 1

As shown in FIG. 4, the BS transmits downlink data to the UE via a primary component carrier and a secondary component carrier in a order shown in FIG. 4, and the UE detects the downlink data to obtain indication information ACK on correctly receiving the downlink data or indication information NACK on wrongly receiving the downlink data, or other indication information, such as indication information DTX on no control information being received; then the UE arranges the detection results according to the DAI values, and cases of arrangement are as shown in FIG. 8. Wherein the downlink data to which DAI=1 and DAI=4 correspond are missed in detection, and the number of ACK detected on the SCC is 2, corresponding to different PUCCHs, that is (DAI=2 corresponding to PUCCH2) and (DAI=3 corresponding to PUCCH3). In this way, the UE may generate uplink response signals according to the position and number of ACK in the information sequence.

As shown in FIG. 8, if the ACK is at the starting position of the sequence and is obtained by detecting the first downlink data transmitted by the BS, that is, the downlink data to which DAI=0 corresponds is correctly received, and there is only one ACK in the forward direction, then ACK in the forward direction on correct receiving is generated, and the uplink resource for transmitting the signal is determined as PUCCH0. In this way, when the BS receives the ACK on the PUCCH0, it may determine that the first downlink data is received correctly at the UE side, and hence determine that the downlink data on the PCC to which DAI=1 and DAI=4 correspond and the downlink data on the SCC to which DAI=2 and DAI=3 correspond need to be retransmitted. Therefore, the BS may avoid unnecessary data retransmission.

Furthermore, as shown in FIG. 8, although the information sequence ends with the ACK, the ending position is not the last resource in the downlink resources capable of transmitting downlink data. Thus, ACK in the forward direction on correctly receiving is generated.

Example 2

Figure 14:
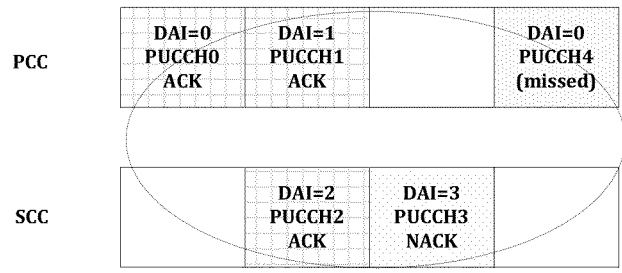
FIGS. 14 and 15 are schematic diagrams of application example 2 of embodiment 3 of the present invention.
Figure 15:
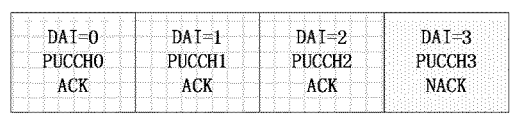

FIG. 14 is a schematic diagram of a detection result obtained by a UE through detecting the downlink data transmitted by a BS, and FIG. 15 is a schematic diagram of the indication information sequence obtained by arranging according to obtained DAI values.

The BS transmits downlink data via a PCC and a SCC to the UE in a order shown in FIG. 14, and the UE detects the downlink data to obtain indication information ACK on correctly receiving the downlink data or indication information NACK on wrongly receiving the downlink data, or other indication information, such as indication information DTX on no control information being received; then the UE arranges the detection results according to the DAI values, and cases of arrangement are as shown in FIG. 15. Wherein the number of ACK detected on the SCC is 2, corresponding to different PUCCHs, that is (DAI=2 corresponding to PUCCH2) and (DAI=3 corresponding to PUCCH3). In this way, the UE may generate uplink response signals according to the position and number of ACK in the information sequence.

As shown in FIG. 15, if the ACK is at the starting position of the sequence and is obtained by detecting the first downlink data transmitted by the BS, that is, the downlink data to which DAI=0 corresponds is correctly received, and there are three ACK in the forward direction, then ACK in the forward direction on correct receiving is generated, and the uplink resource for transmitting the signal is determined as PUCCH2 to which the last ACK corresponds. In this way, when the BS receives the ACK on the PUCCH2, it may determine that the preceding three successive downlink data are received correctly at the UE side (that is, DAI=0, DAI=1 and DAI=2), and hence determine that the downlink data on the PCC to which DAI=4 corresponds and the downlink data on the SCC to which DAI=3 corresponds need to be retransmitted.

Example 3

Figure 16:
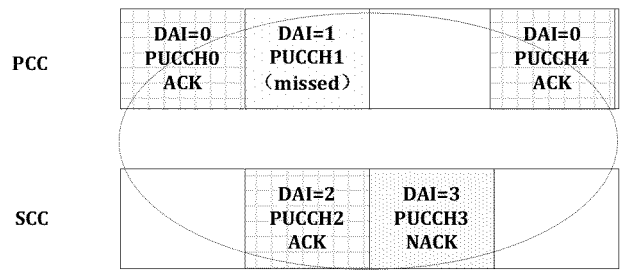
FIGS. 16 and 17 are schematic diagrams of application example 3 of embodiment 3 of the present invention.
Figure 17:
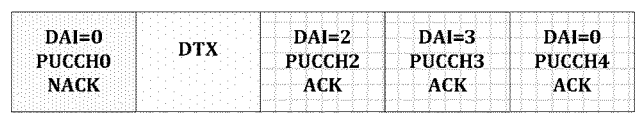

FIG. 16 is a schematic diagram of a detection result obtained by a UE through detecting the downlink data transmitted by a BS, and FIG. 17 is a schematic diagram of the indication information sequence obtained by arranging the detection results of FIG. 16 according to DAI values.

The BS transmits downlink data via a PCC and a SCC to the UE in a order shown in FIG. 16, and the UE detects the downlink data to obtain indication information ACK on correctly receiving the downlink data or indication information NACK on wrongly receiving the downlink data, or other indication information, such as indication information DTX on no control information being received; then the UE arranges the detection results according to the DAI values, and cases of arrangement are as shown in FIG. 17. Wherein the number of ACK detected on the SCC is 2, corresponding to different PUCCHs, that is (DAI=2 corresponding to PUCCH2) and (DAI=3 corresponding to PUCCH3). In this way, the UE may generate uplink response signals according to the position and number of ACK in the information sequence.

As shown in FIG. 17, if the ACK is at the ending position of the sequence and such a position is the position to which the last downlink data corresponds, and there are three ACK in the backward direction, then NACK in the backward direction on correct receiving is generated, and the uplink resource for transmitting the signal is determined as PUCCH2 to which the last ACK corresponds. In this way, when the BS receives the NACK on the PUCCH2, it may determine that the following three successive downlink data are received correctly at the UE side, and hence determine that the downlink data on the PCC to which DAI=0 and DAI=1 correspond need to be retransmitted.

Example 4

Figure 18:
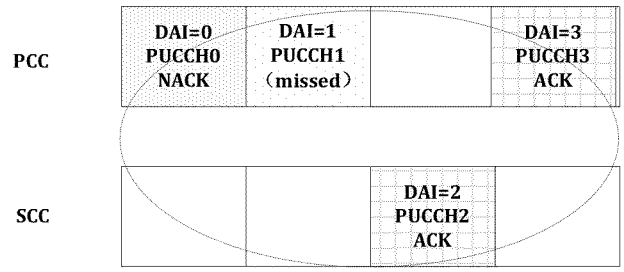
FIGS. 18 and 19 are schematic diagrams of application example 4 of embodiment 3 of the present invention.
Figure 19:
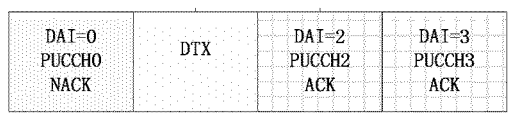

FIG. 18 is a schematic diagram of a detection result obtained by a UE through detecting the downlink data transmitted by a BS, and FIG. 19 is a schematic diagram of the indication information sequence obtained by arranging the detection results of FIG. 18 according to DAI values.

The BS transmits downlink data via a PCC and a SCC to the UE in a order shown in FIG. 18, and the UE detects the downlink data to obtain indication information ACK on correctly receiving the downlink data or indication information NACK on wrongly receiving the downlink data, or other indication information, such as indication information DTX on no control information being received; then the UE arranges the detection results according to the DAI values, and cases of arrangement are as shown in FIG. 19. Wherein the number of ACK detected on the SCC is 1, corresponding to PUCCH2 (DAI=2). In this way, the UE may generate uplink response signals according to the position and number of ACK in the information sequence.

As shown in FIG. 19, if the ACK is at the ending position of the sequence and such a position is the position to which the last downlink resource corresponds, and there are two ACK in the backward direction, then NACK in the backward direction on correct receiving is generated, and the uplink resource for transmitting the signal is determined as PUCCH2 to which the last ACK corresponds. In this way, when the BS receives the NACK on the PUCCH2, it may determine that the following two successive downlink data are received correctly at the UE side, and hence determine that the downlink data on the PCC to which DAI=0 and DAI=1 correspond need to be retransmitted.

It can be seen from the above example that, in the case where the number of indication information obtained by detecting on the SCC is 1, or the number is greater than 1 and the indication information corresponds to different resources, no matter whether the DAI values obtained on the SCC are successive or not, the UE may generate uplink response signals according to the position and number of ACK in the information sequence. The manner of processing in full bundling for a TDD system in Rel.8 may be referred to for the manners of processing these cases, such as the method of the application No. PCT/CN2010/076603, the contents of which being incorporated herein by reference.

However, if the number of indication information obtained by detecting on the SCC is greater than 1, the DAI values are successive and the indication information corresponds to the same PDCCH, when a corresponding PUCCH on the SCC is needed to be used, uplink response signals need to be generated according to the indication information obtained by detecting on the SCC and the position and number of the indication information correctly received in the indication information sequence, following the rules below:

1) when the indication information sequence starts with ACK and the starting ACK is a detection result obtained by detecting the first downlink data transmitted by the BS (that is, DAI=0), the uplink response signals may be fed back via PUCCH on the SCC only when all the detection results obtained by detecting the downlink data in the SCC are ACK; otherwise, the uplink response signals are fed back via PUCCH to which the last ACK in the correctly received ACK in the forward direction starting with the first ACK corresponds and preceding the PUCCH on the SCC; and 2) when the indication information sequence ends with ACK and the ending position is the last downlink resource capable of transmitting the downlink data, the uplink response signals may be fed back via PUCCH on the SCC only when all the detection results obtained by detecting the downlink data in the SCC are ACK; otherwise, the uplink response signals are fed back via PUCCH to which the last ACK in the correctly received ACK in the backward direction starting with the first ACK corresponds and following the PUCCH on the SCC.

The procedures for processing the above cases shall be described below with reference to drawings.

Example 5

Figure 20:
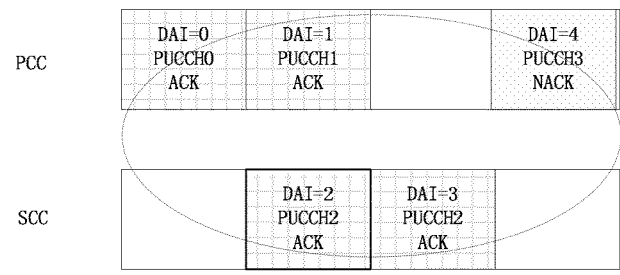
FIGS. 20 and 21 are schematic diagrams of application example 5 of embodiment 3 of the present invention.
Figure 21:
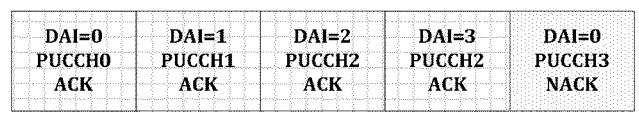

FIG. 20 is a schematic diagram of a detection result obtained by a UE through detecting the downlink data transmitted by a BS, and FIG. 21 is a schematic diagram of the indication information sequence obtained by arranging the detection results of FIG. 20 according to DAI values.

The BS transmits downlink data via a PCC and a SCC to the UE in a order shown in FIG. 20, and the UE detects the downlink data to obtain indication information ACK on correctly receiving the downlink data or indication information NACK on wrongly receiving the downlink data, or other indication information, such as indication information DTX on no control information being received; then the UE arranges the detection results according to the DAI values, and cases of arrangement are as shown in FIG. 21. Wherein the number of ACK detected on the SCC is 2, corresponding to PUCCH2 (DAI=2 and PUCCH2 (DAI=3), and the uplink resources allocated on the SCC are identical. In this way, the UE may generate uplink response signals according to the indication information obtained by detecting on the SCC, and the position and number of indication information correctly received in the information sequence.

As shown in FIG. 21, if the ACK is at the start of the sequence and the starting ACK is a detection result obtained by detecting the first downlink data transmitted by the BS (that is, DAI=0), there are four ACK in the forward direction and the two downlink data transmitted on the SCC are both correctly received, that is, all the corresponding indication information on the SCC is ACK, then ACK in the forward direction on correct receiving is generated, and the uplink resource for transmitting the signal is determined as PUCCH2 to which the last ACK corresponds. In this way, when the BS receives the ACK on the PUCCH2, it may determine that the preceding four successive downlink data are received correctly at the UE side, and hence determine that the downlink data on the PCC to which DAI=4 corresponds needs to be retransmitted.

Example 6

FIG. 22 is a schematic diagram of a detection result obtained by a UE through detecting the downlink data transmitted by a BS, and FIG. 23 is a schematic diagram of the indication information sequence obtained by arranging the detection results of FIG. 22 according to DAI values.

The difference between Example 6 and Example 5 exists in that the indication information obtained by detecting on the SCC are not all ACK, which are ACK and NACK, as shown in FIGS. 22 and 23.

As shown in FIG. 23, if the ACK is at the start of the sequence and the starting ACK is a detection result obtained by detecting the first downlink data transmitted by the BS (that is, DAI=0), there are three ACK in the forward direction and only one of the two downlink data transmitted on the SCC is correctly received, then ACK in the forward direction on correct receiving is generated, and the uplink resource for transmitting the signal is determined as PUCCH1 to which the last ACK in the correctly received ACK in the forward direction starting with the first ACK and preceding the SCC, instead of PUCCH2 to which DAI=2 corresponds. In this way, when the BS receives the ACK on the PUCCH1, it may determine that the preceding two successive downlink data are received correctly at the UE side, and hence determine that the downlink data on the PCC to which DAI=4 corresponds and the downlink data on the SCC to which DAI=2 and DAI=3 correspond need to be retransmitted.

If the indication information obtained by detecting on the SCC is "NACK and ACK" or "NACK and NACK", the manners of processing are the same as described above, which shall not described any further.

Example 7

FIG. 24 is a schematic diagram of a detection result obtained by a UE through detecting the downlink data transmitted by a BS, and FIG. 25 is a schematic diagram of the indication information sequence obtained by arranging the detection results of FIG. 24 according to DAI values.

The difference between Example 7 and Example 5 exists in that the ACK is located at the end of the indication information sequence.

As shown in FIG. 25, if the ACK is at the end of the sequence and the ending position is the last downlink resource capable of transmitting downlink data, there are three ACK in the backward direction and the two downlink data transmitted on the SCC are correctly received, that is, all the corresponding indication information on the SCC are ACK, then NACK in the backward direction on correct receiving is generated, and the uplink resource for transmitting the signal is determined as PUCCH2 to which the last ACK corresponds. In this way, when the BS receives the NACK on the PUCCH2, it may determine that the following three successive downlink data are received correctly at the UE side, and hence determine that the downlink data on the PCC to which DAI=0 and DAI=1 correspond need to be retransmitted.

Example 8

Figure 26:
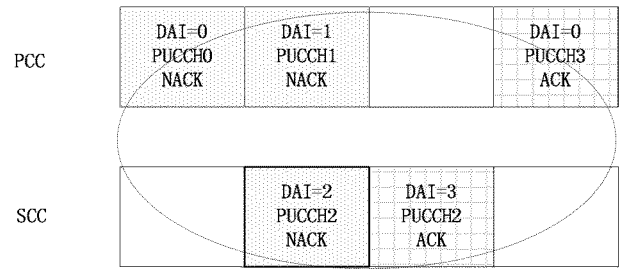
FIGS. 26 and 27 are schematic diagrams of application example 8 of embodiment 3 of the present invention.
Figure 27:
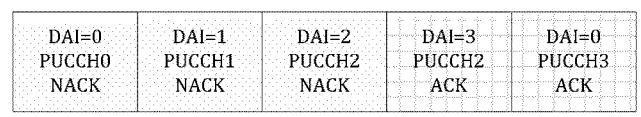

FIG. 26 is a schematic diagram of a detection result obtained by a UE through detecting the downlink data transmitted by a BS, and FIG. 27 is a schematic diagram of the indication information sequence obtained by arranging the detection results of FIG. 26 according to DAI values.

The difference between Example 8 and Example 7 exists in that the indication information obtained by detecting on the SCC are not all ACK, which are ACK and NACK, as shown in FIGS. 26 and 27.

As shown in FIG. 27, if the ACK is at the end of the sequence and the ending position is the last downlink resource capable of transmitting downlink data, there are two ACK in the backward direction and only one of the two downlink data transmitted on the SCC is correctly received, then NACK in the backward direction on correct receiving is generated, and the uplink resource for transmitting the signal is determined as PUCCH3 to which the last ACK in the successive ACK correctly received in the backward direction starting with the first ACK corresponds and following the SCC, instead of PUCCH2 to which DAI=3 corresponds. In this way, when the BS receives the NACK on the PUCCH3, it may determine that the last downlink data is received correctly at the UE side, and hence determine that the downlink data on the PCC to which DAI=0 and DAI=1 correspond and the downlink data on the SCC to which DAI=2 and DAI=3 correspond need to be retransmitted.

If the indication information obtained by detecting on the SCC is "ACK and NACK" or "NACK and NACK", the manners of processing are the same as described above, which shall not described any further.

The above examples 5-8 are for the case where the number of indication information obtained by detecting on the SCC is greater than 1, the DAI values are successive and the indication information corresponds to the same PDCCH. A case where the DAI values obtained by detecting on the SCC are not successive shall be described below. It should be noted that in this embodiment, the following rules need to be taken into consideration only when the PUCCHs on the SCC are needed to feed back uplink response signals:

1) when the indication information sequence starts with ACK and the starting ACK is a detection result obtained by detecting the first downlink data transmitted by the BS (that is, DAI=0), the uplink response signals may be fed back via the PUCCH on the SCC only when all the detection results obtained by detecting the downlink data in the SCC are ACK; otherwise, the uplink response signals are fed back via the PUCCH to which the last ACK in the successive ACK correctly received in the forward direction starting with the first ACK corresponds and preceding the PUCCH on the SCC; and 2) when the indication information sequence ends with ACK and the ending position is the last downlink resource capable of transmitting the downlink data, the uplink response signals may be fed back via the PUCCH on the SCC only when all the detection results obtained by detecting the downlink data in the SCC are ACK; otherwise, the uplink response signals are fed back via the PUCCH to which the last ACK in the successive ACK correctly received in the backward direction starting with the ACK at the ending position corresponds and following the PUCCH on the SCC.

Example 9

Figure 28:
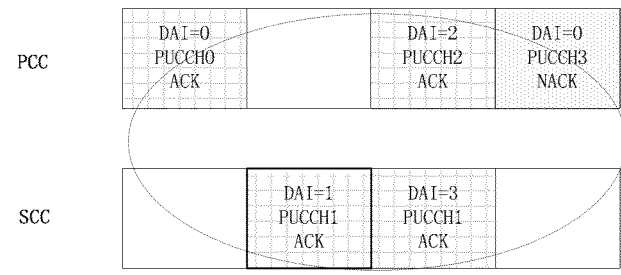
FIGS. 28 and 29 are schematic diagrams of application example 9 of embodiment 3 of the present invention.
Figure 29:
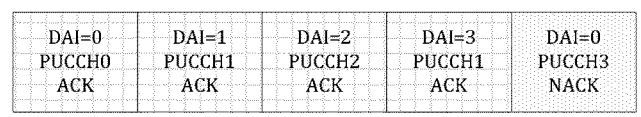

FIG. 28 is a schematic diagram of a detection result obtained by a UE through detecting the downlink data transmitted by a BS, and FIG. 29 is a schematic diagram of the indication information sequence obtained by arranging the detection results of FIG. 28 according to DAI values.

It differs from Example 5 in that the DAI values in the SCC are not successive.

As shown in FIG. 29, if the ACK is at the start of the sequence and the starting ACK is a detection result obtained by detecting the first downlink data transmitted by the BS (that is, DAI=0), there are four ACK in the forward direction and the two downlink data transmitted on the SCC are both correctly received, that is, all the corresponding indication information on the SCC is ACK, then ACK in the forward direction on correct receiving is generated, and the uplink resource for transmitting the signal is determined as PUCCH1 to which the last ACK corresponds. In this way, when the BS receives the ACK on the PUCCH1, it may determine that the preceding four successive downlink data are received correctly at the UE side, and hence determine that the downlink data on the PCC to which DAI=4 corresponds needs to be retransmitted.

Example 10

FIG. 30 is a schematic diagram of a detection result obtained by a UE through detecting the downlink data transmitted by a BS, and FIG. 31 is a schematic diagram of the indication information sequence obtained by arranging the detection results of FIG. 30 according to DAI values.

It differs from Example 9 in that the indication information obtained by detecting on the SCC are not all ACK, which are ACK and NACK, as shown in FIGS. 30 and 31.

As shown in FIG. 31, if the ACK is at the start of the sequence and the starting ACK is a detection result obtained by detecting the first downlink data transmitted by the BS (that is, DAI=0), there are three ACK in the forward direction and only one of the two downlink data transmitted on the SCC is correctly received, then ACK in the forward direction on correct receiving is generated, and the uplink resource for transmitting the signal is determined as PUCCH2 to which the last ACK in the successively correctly received ACK in the forward direction starting with the first ACK corresponds. As corresponding PUCCH1 on the SCC is not needed to be used, the processing is performed as a usually case. In this way, when the BS receives the ACK on the PUCCH2, it may determine that the preceding three downlink data are received correctly at the UE side, and hence determine that the downlink data on the PCC to which DAI=4 corresponds and the downlink data on the SCC to which DAI=3 corresponds need to be retransmitted.

Example 11

FIG. 32 is a schematic diagram of a detection result obtained by a UE through detecting the downlink data transmitted by a BS, and FIG. 33 is a schematic diagram of the indication information sequence obtained by arranging the detection results of FIG. 32 according to DAI values.

In the case shown in FIGS. 32 and 33, PUCCH1 is needed. In such a case, as the indication information obtained through detecting on the SCC is not all ACK, but ACK and NACK, it is determined that the uplink resource for transmitting the signal is PUCCH0 to which the last ACK in the successively correctly received ACK in the forward direction starting with the first ACK corresponds and preceding DAI=1, instead of PUCCH1.

Example 12

Figure 34:
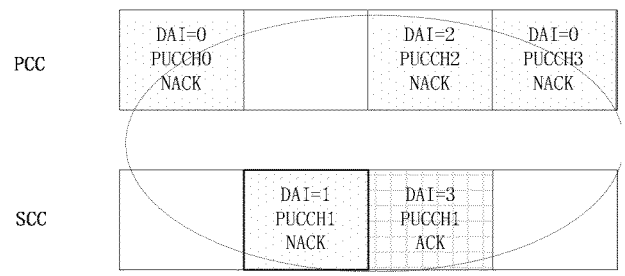
FIGS. 34 and 35 are schematic diagrams of application example 12 of embodiment 3 of the present invention.
Figure 35:
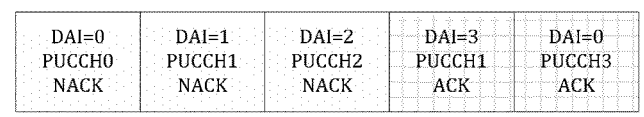

FIG. 34 is a schematic diagram of a detection result obtained by a UE through detecting the downlink data transmitted by a BS, and FIG. 35 is a schematic diagram of the indication information sequence obtained by arranging the detection results of FIG. 34 according to DAI values.

In the case shown in FIGS. 34 and 35, if the ACK is at the end of the sequence and the ending position is the last downlink resource capable of transmitting the downlink data, PUCCH1 is needed. In such a case, as the indication information obtained through detecting on the SCC is not all ACK, but NACK and ACK, it is determined that the uplink resource for transmitting the signal is PUCCH3 to which the last ACK in the successively correctly received ACK in the backward direction starting with the first ACK corresponds and following DAI=3, instead of PUCCH1.

The above embodiment is described taking that the ACK is at the start or end of the indication information sequence as an example. Wherein the ending position refers to the position of the last downlink resource capable of transmitting the downlink data, and the ACK at the starting position indicates a detection result obtained through detecting the first downlink data transmitted by the BS (i.e. DAI=0).

Furthermore, in the embodiment shown in FIG. 13, after step 1302, following steps may be included (not shown): determining whether the ACK is located at the ending position, and determining whether a first number of successively correctly received indication information in the forward direction starting from the correctly received indication information at the start of the indication information sequence is greater than or equal to a second number of successively correctly received indication information in the backward direction starting from the correctly received indication information at the end of the indication information sequence;

generating a third indication signal if it is determined that the first number is greater than or equal to the second number, with the third indication signal being the uplink response signal; wherein the third indication signal represents that the downlink data is correctly received which is related to N2 pieces of successively correctly received indication information starting with the correctly received indication information at the starting position and ending with the last correctly received indication information in the forward direction, with N2 being a positive integer greater than or equal to 1; and determining to feed back the third indication signal in the uplink resource corresponding to the last correctly received indication information in the forward direction; and generating a fourth indication signal if it is determined that the first number is less than the second number, with the fourth indication signal being the uplink response signal; wherein the fourth indication signal represents that the downlink data is correctly received which is related to M2 pieces of successively correctly received indication information starting with the correctly received indication information at the ending position and ending with the last correctly received indication information in the backward direction, with M2 being a positive integer greater than or equal to 1; and determining to feed back the fourth indication signal in the uplink resource corresponding to the last correctly received indication information in the backward direction.

It can be seen from the above embodiment that if the correctly received indication information ACK is at both of the start and end of the indication information sequence, the above manners may be used in processing, so as to improve the efficiency of transmission. In addition, the orders of carrying out the steps shown in FIG. 13 are not limited to those as described above, and may be set as actually required.

The above case shall be described below with reference to figures.

Figure 36:
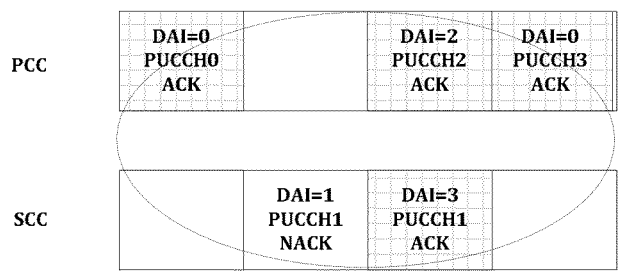
FIG. 36 is a schematic diagram of the detection result of the downlink data transmitted from the BS obtained by the terminal equipment.
Figure 37:
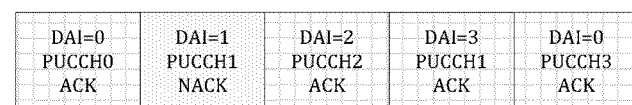
FIG. 37 is a schematic diagram of the indication information sequence obtained through arranging the detection result shown in FIG. 36 according to the DAI values.

FIG. 36 is a schematic diagram of a detection result obtained by a UE through detecting the downlink data transmitted by a BS, and FIG. 37 is a schematic diagram of the indication information sequence obtained by arranging the detection results of FIG. 36 according to DAI values.

In the case shown in FIGS. 36 and 37, the ACK is at the start of the sequence and the end of the sequence, the number of successive ACK in the forward direction starting from the first ACK is 1 and the number of successive ACK in the backward direction starting from the last ACK is 3. In such a case, uplink response signal NACK is generated, indicating that the downlink data is correctly received which is related to 3 pieces of successively correctly received indication information starting with the correctly received indication information at the ending position and ending with the last correctly received indication information in the backward direction, and it is determined that PUCCH2 to which the last correctly received indication information in the backward direction corresponds feeds back the NACK.

Similar to the above case, if the number of successive ACK in the forward direction starting from the first ACK is greater than the number of successive ACK in the backward direction starting from the last ACK, it is determined that the ACK is fed back on the uplink resource to which the last correctly received indication information in the forward direction corresponds.

It can be seen from the above embodiment that the amount of data to be retransmitted can be reduced to a maximum extent by determining a generated uplink response signal through comparing the numbers of preceding and following successive ACK and determining the uplink resources used.

In the above embodiment, a BPSK modulation symbol is applicable to transmit the uplink response signal ACK or NACK, and a mapping relation between the modulation symbol and the response signal may be negotiated by the BS and the UE in advance. Two states may only be fed back in such a case, as shown in Table 1, wherein when the modulation symbol is 1, it corresponds to ACK, and when the modulation symbol is 0, it corresponds to NACK.

TABLE 1

| Modulation symbol | Response signal |
| --- | --- |
| 1 | ACK |
| 0 | NACK |

What described above is an embodiment only, and 1 may also correspond to NACK, and 0 may correspond to ACK.

In this embodiment, QPSK modulation symbols may also be used, so as to feed back more information. In this case, there are four states, as shown in Table 2.

TABLE 2

| Modulation symbol | Response signal |
| --- | --- |
| (1, 1) | ACK |
| (0, 0) | NACK1 |
| (1, 0) | NACK2 |
| (0, 1) | NACK3 |

Figure 38A:
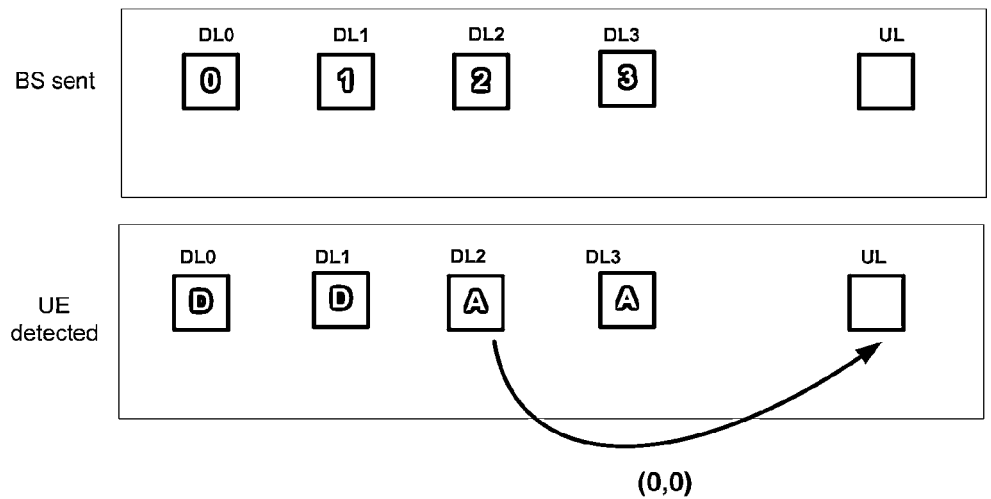
FIGS. 38A, 38B, and 38C are schematic diagrams of corresponding relations between QPSK modulation symbol and the response signal.
Figure 38B:
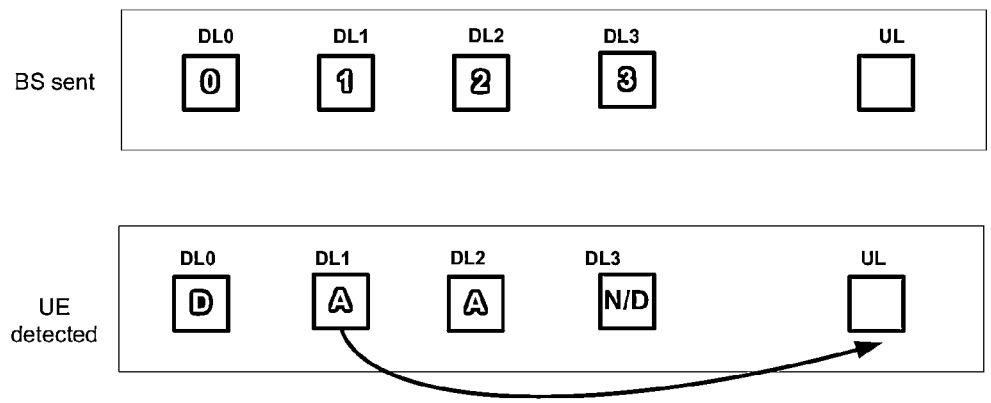
Figure 38C:
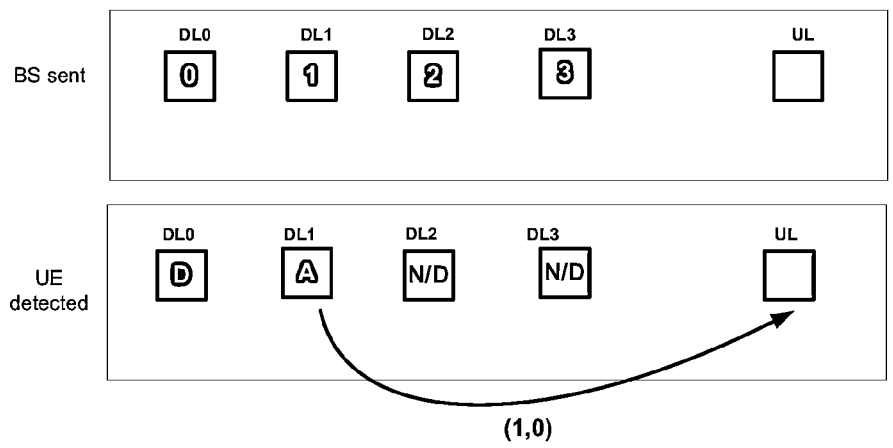

For example, a QPSK modulation symbol (1, 1) is used to denote the ACK, with the meaning being the same as what is described above, and QPSK modulation symbols (0, 1), (1, 0) and (0, 0) denotes NACK, respectively; wherein (0, 0) corresponds to "0" in the BPSK, denoting that the downlink data located from the position for feeding back the uplink signal to the last physical position are correctly received, as shown in FIG. 38A; (0, 1) denotes that the downlink data located from the position for feeding back the uplink signal to the last physical position but one are correctly received, as shown in FIG. 38B; and (1, 0) denotes that the downlink data located from the position for feeding back the uplink signal to the last physical position but two are correctly received, as shown in FIG. 38C. Of course, the QPSK modulation symbols may also be used to denote other meanings.

In such a case, when a QPSK modulation symbol is used to feed back an uplink response signal. For the case that a corresponding ACK is neither at the start of the sequence nor at the end of the indication information, feedback can also be performed, so that the BS avoids unnecessary data retransmission, improving the efficiency of transmission.

It should be understood by those skilled in the art that all or part of the steps in the methods of the above embodiments may be implemented by related hardware instructed by a program, and the program may be stored in a computer-readable storage medium. In executing the program, all or part of the steps in the methods of the above embodiments may be included, and the storage medium may comprise an ROM, an RAM, a floppy disk, and a compact disk, etc.

An embodiment of the present invention provides also a BS and a terminal equipment as described below. As the principles of the BS and the terminal equipment for solving problems are similar to those of the method for transmitting uplink response signal based on a BS and the terminal equipment as described above, the implementation of the method may be referred to for the implementation of the BS and terminal equipment, and the repeated parts shall not be described further. Wherein, the terminal equipment may be a UE.

Embodiment 4

Figure 39:
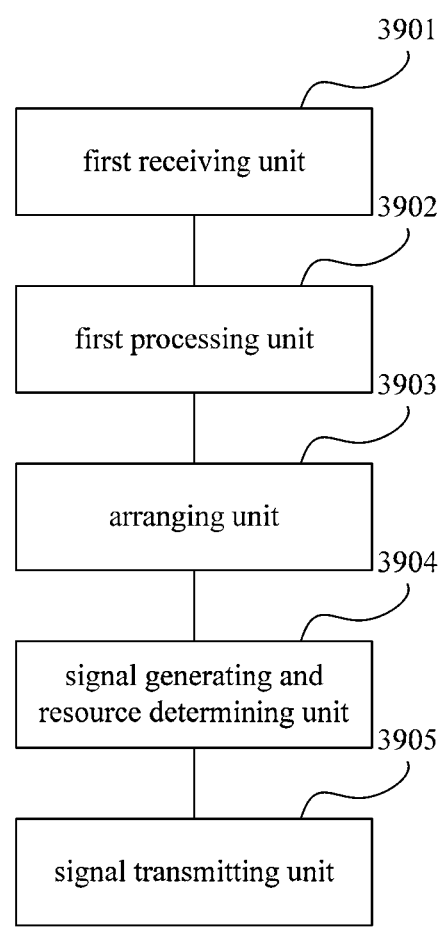
FIG. 39 is a schematic diagram of the structure of the terminal equipment of embodiment 4 of the present invention.

An embodiment of the present invention provides a terminal equipment. As shown in FIG. 39, the terminal equipment comprises:

- a first receiving unit 3901 for receiving downlink data transmitted by a BS via a primary component carrier and a secondary component carrier in a predetermined order;
- a first processing unit 3902 for detecting the downlink data received by the first receiving unit 3901 to obtain indication information on correctly receiving the downlink data, wrongly receiving the downlink data, or no control information being received, and allocating corresponding uplink resources according to the primary component carrier and secondary component carrier where the detected downlink data is present;
- an arranging unit 3903 for arranging the indication information obtained through detecting by the first processing unit 3902 according to the order of transmitting the downlink data by the base station to obtain an indication information sequence;
- a signal generating and resource determining unit 3904 for generating an uplink response signal according to the indication information in the indication information sequence obtained at the corresponding secondary component carrier and the position and number of the correctly received indication information in the indication information sequence, and for determining the uplink resources used to feed back the uplink response signal; and
- a signal transmitting unit 3905 for transmitting the uplink response signal to the base station by using the uplink resources determined by the signal generating and resource determining unit 3904, such that the BS determines the downlink data needing to be retransmitted according to the uplink response signal fed back in the uplink resources.

Figure 40:
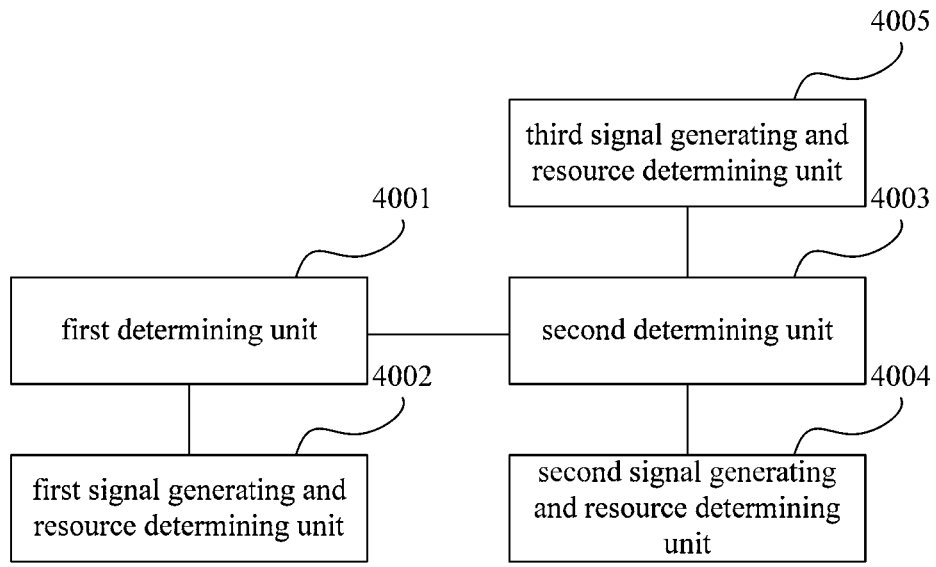
FIG. 40 is a schematic diagram of the structure of the signal generating and resource determining unit 3904 of embodiment 4 of the present invention.

FIG. 40 is a schematic diagram of the structure of the signal generating and resource determining unit 3904 of embodiment 4 of the present invention. As shown in FIG. 40, the signal generating and resource determining unit 3904 comprises:

- a first determining unit 4001 for determining the number of the indication information in the indication information sequence obtained through detecting at the secondary component carrier; and
- a first signal generating and resource determining unit 4002 for generating an uplink response signal according to the position and number of the correctly received indication information in the indication information sequence when it is determined by the first determining unit 4001 that the number of the indication information obtained through detecting at the secondary component carrier is 1, and for determining the uplink resources used to feed back the uplink response signals.

As shown in FIG. 40, the signal generating and resource determining unit 4001 further comprises:

- a second determining unit 4003 for further determining whether the uplink resources allocated at the secondary component carrier are identical when the result determined by the first determining unit is that the number of the indication information obtained through detecting at the secondary component carrier is greater than 1; and
- a second signal generating and resource determining unit 4004 for generating an uplink response signal according to the position and number of the correctly received indication information in the indication information sequence when the result determined by the second determining unit 4003 is that the uplink resources allocated at the secondary component carrier are different, and for determining the uplink resources used to feed back the uplink response signals.

As shown in FIG. 40, the signal generating and resource determining unit 3904 further comprises:

- a third signal generating and resource determining unit 4005 for generating an uplink response signal according to the indication information obtained through detecting at the secondary component carrier and the position and number of the correctly received indication information in the indication information sequence when the result determined by the second determining unit 4003 is that the uplink resources allocated at the secondary component carrier are identical, and for determining the uplink resources used to feed back the uplink response signals.

Wherein the methods of generating uplink response signals and determining uplink resources used to feed back the uplink response signals by the first signal generating and resource determining unit 4002, the second signal generating and resource determining unit 4004 and the third signal generating and resource determining unit 4005 are as described in Embodiment 3, which shall not be described any further.

It can be seen from the above embodiment that by arranging the detection result on the PCC and SCC and generating uplink response signals indicative of directions according to the indication information in the indication information sequence obtained by detecting on the corresponding SCC and the position and number of the correctly received indication information in the indication information sequence, the BS may determine the correctly received downlink data after receiving the uplink response signals on the uplink resources, and hence determine downlink data needing to be retransmitted. Thus, the BS may avoid unnecessary data retransmission in full bundling, improving the efficiency of data transmission.

Embodiment 5

Figure 41:
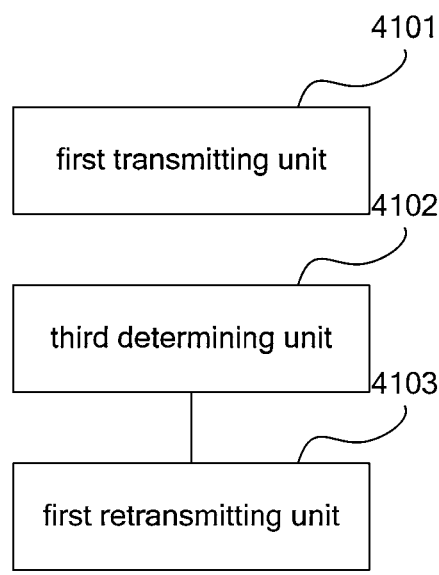
FIG. 41 is a schematic diagram of the structure of the BS of embodiment 5 of the present invention.

An embodiment of the present invention provides a BS. As shown in FIG. 41, the BS comprises:

- a first transmitting unit 4101 for transmitting downlink data to a terminal equipment via a primary component carrier and a secondary component carrier in a predetermined order;
- a third determining unit 4102 for determining whether the uplink response signal fed back in response to the indication information sequence is received in the uplink resource, the indication information sequence containing indication information on correctly receiving the downlink data, wrongly receiving the downlink data, or no control information being received is obtained through the terminal equipment detecting the downlink data transmitted by the first transmitting unit 4101; and
- a first retransmitting unit 4103 for retransmitting selectively the downlink data according to the uplink response signals fed back in the uplink resource when it is determined by the third determining unit 4102 that the uplink response signals are received in the uplink resource.

In this embodiment, the process of feeding the uplink response signals by the terminal equipment back to the BS is as described in embodiments 1 and 3, which shall not be described any further.

In this embodiment, the direction from the first piece of indication information to the last piece of indication information in the indication information sequence denotes a forward direction, and the reverse direction denotes a backward direction, and following description is given taking the above directions as an example; however, this is an embodiment only, and vise versa. The uplink response signal may be an indication signal indicating correct receiving in the forward direction or an indication signal indicating correct receiving in the backward direction, as described in the above embodiments.

In this embodiment, the first retransmitting unit 4103 may comprise:

- a signal type determining unit for determining whether the received uplink response signal is a correctly received indication signal in the forward direction or in the backward direction; for example, if ACK is received, it may be determined that it is a correctly received indication signal in the forward direction, and if NACK is received, it may be determined that it is a correctly received indication signal in the backward direction;
- a correctly receiving data determining unit for determining the downlink data correctly received by the terminal equipment according to the received uplink response signal and the uplink resource for transmitting the uplink response signal; and
- a data retransmitting unit for retransmitting other downlink data than that correctly received by the terminal equipment determined by the correctly receiving data determining unit among the downlink data transmitted by the first transmitting unit 4101.

Wherein the correctly receiving data determining unit may use the manner below to determine the downlink data correctly received by the terminal equipment:

when the correctly receiving data determining unit receives the indication information ACK on correctly receiving the downlink data in the forward direction fed back by the terminal equipment, it may determine that the downlink data transmitted via the downlink resource to which the uplink resource for transmitting the indication information ACK in the forward direction corresponds and the downlink data transmitted via S1 successive downlink resources following above downlink resource are correctly received by the terminal equipment; in this way, the data retransmitting unit retransmits other downlink resources (not indicated by the uplink response signal); wherein S1 is an integer greater than or equal to 1.

when the BS receives the indication information NACK on correctly receiving the downlink data in the backward direction fed back by the terminal equipment, it may determine that the downlink data transmitted via the downlink resource to which the uplink resource for transmitting the indication information NACK in the backward direction corresponds and the downlink data transmitted by S2 successive downlink resources preceding above downlink resource are correctly received by the terminal equipment; in this way, the data retransmitting unit retransmits other downlink resources (not indicated by the uplink response signal); wherein S1 and S2 are integers greater than or equal to 1.

It can be seen from the above embodiment that by arranging the detection result on the PCC and SCC and generating uplink response signals indicative of directions according to the indication information in the indication information sequence obtained by detecting on the corresponding SCC and the position and number of the correctly received indication information in the indication information sequence, the BS may determine the correctly received downlink data after receiving the uplink response signals on the uplink resources, and hence determine downlink data needing to be retransmitted. Thus, the BS may avoid unnecessary data retransmission in full bundling, improving the efficiency of data transmission.

Embodiment 6

Figure 42:
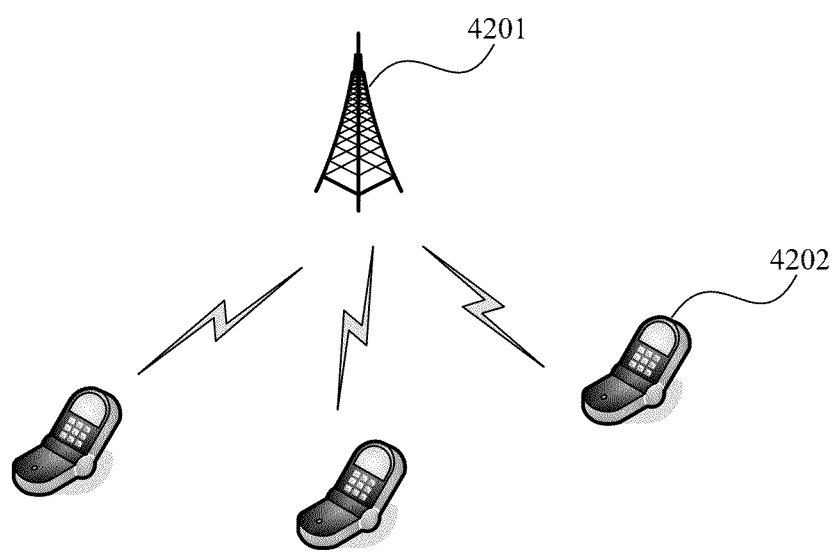
FIG. 42 is a schematic diagram of the structure of the communication system of embodiment 6 of the present invention.

An embodiment of the present invention provides a communication system. As shown in FIG. 42, the system comprises:

a BS 4201 and a terminal equipment 4202; wherein the constitutions of the BS and the terminal equipment are as described in embodiments 4 and 5, which shall not be described any further.

Embodiment 7

Figure 43:
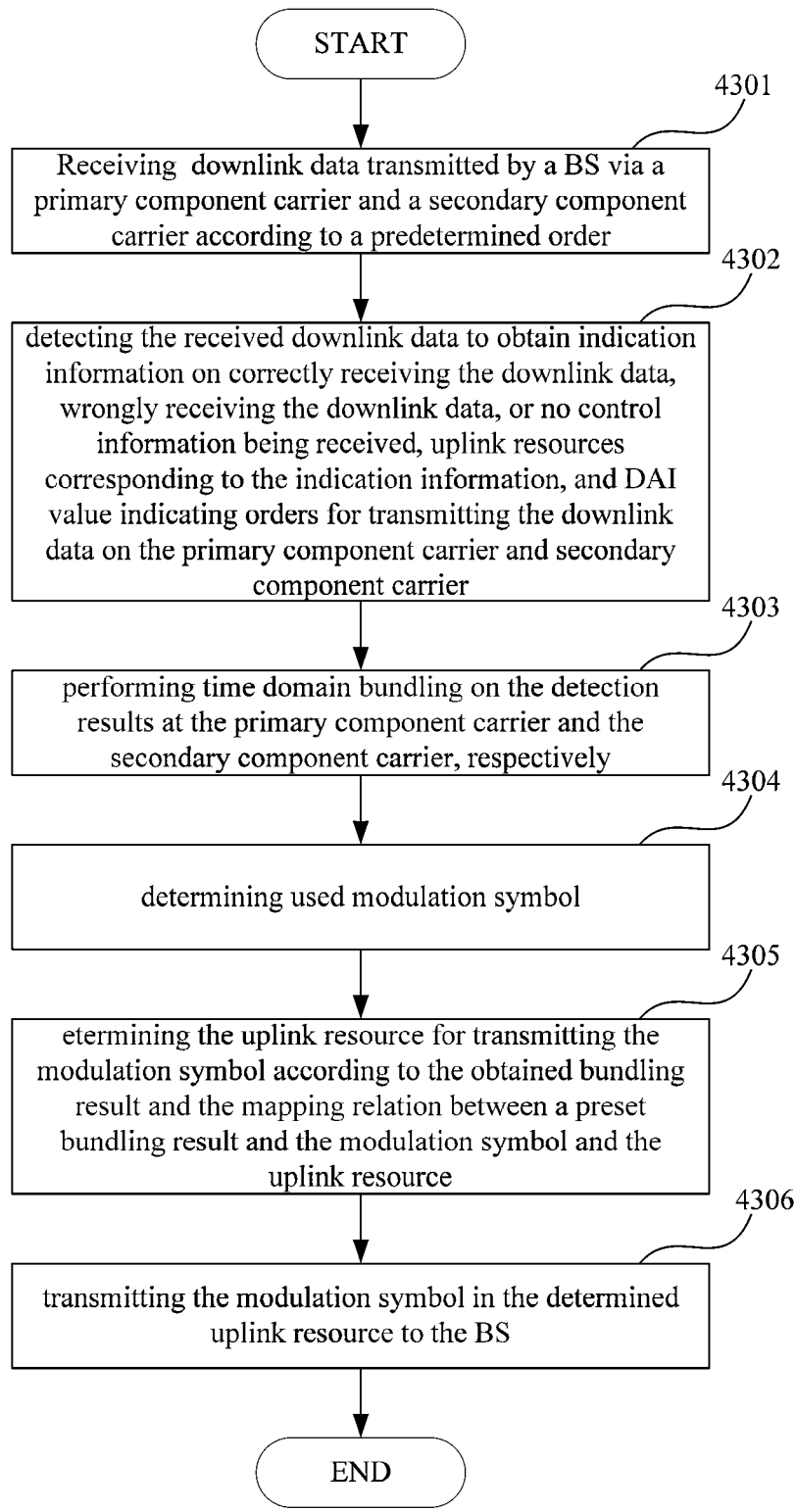
FIG. 43 is a flowchart of the method for transmitting uplink response signal of embodiment 7 of the present invention.

An embodiment of the present invention provides a method for transmitting uplink response signal. As shown in FIG. 43, the method comprises:

step 4301: receiving, by a UE, downlink data transmitted by a BS via a primary component carrier and a secondary component carrier in a predetermined order;

step 4302: detecting the received downlink data to obtain indication information on correctly receiving the downlink data, wrongly receiving the downlink data, or no control information being received, allocating corresponding uplink resources according to the detected primary component carrier and secondary component carrier where the downlink data is present, and obtaining a DAI value indicating orders of transmitting the downlink data on the primary component carrier and secondary component carrier;

wherein, when the BS transmits the downlink data by using a transmission block in a downlink subframe on the PCC and SCC in the predetermined order, the method further comprises:

step 4303: performing time domain bundling on the detection results detected at the primary component carrier and the secondary component carrier, respectively;

step 4304: determining used modulation symbol according to the last downlink assignment indicator DAI value detected at the secondary component carrier and a preset mapping relation between a downlink assignment indicator DAI value, the bundling result at the secondary component carrier and the modulation symbol; or determining the used modulation symbol according to the last downlink assignment indicator DAI value corresponding to the last correctly received indication information in the correctly received indication information successively detected at the secondary component carrier and the preset mapping relation between a downlink assignment indicator DAI value, the bundling result at the secondary component carrier and the modulation symbol;

step 4305: determining the uplink resource for transmitting the modulation symbol according to the obtained bundling result and the mapping relation between a preset bundling result and the modulation symbol and the uplink resource; the uplink resource representing the uplink resource corresponding to the last correctly received indication information in the correctly received indication information successively detected at the primary component carrier or the secondary component carrier; and step 4306: transmitting the modulation symbol in the determined uplink resource to the BS, such that the BS retransmits selectively the downlink data according to the modulation symbol received in the uplink resource.

Figure 45:
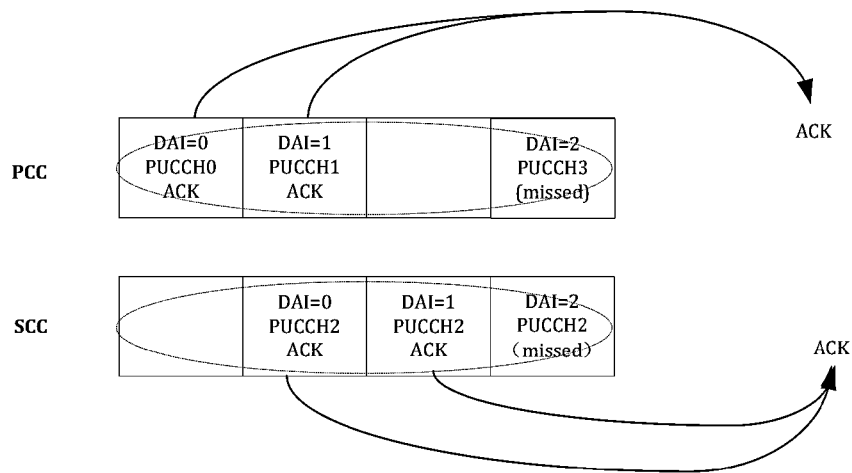
FIG. 45 is a schematic diagram of an application example of the present invention.

In this embodiment, when the BS transmits the downlink data in a predetermined order, a DAI value transmitted in a PDCCH may be used to represent the order. It can be seen from the background art that the DAI value is used for recording the number of the PDCCHs accumulatively transmitted by the BS, and the DAI may be in an order of 0, 1, 2 . . . , etc. In full bundling, the DIA value is effective in each subframe in a CC, and an accumulated number is counted. For example, as shown in FIG. 45, the BS counts at each subframe of a PCC and a SCC, and if the BS transmits data at the PCC, then the DAI values may be 0, 1 and 2 in turn; and if the BS transmits data at the SCC, then on the SCC, the DAI values may be 0, 1 and 2 in turn. In this embodiment, it is not limited to the above manner, and other manners may be used for indicating the orders of transmission.

In this embodiment, in step 4305, in determining the uplink resource for transmitting the modulation symbol according to the obtained bundling result and the mapping relation between a preset bundling result and the modulation symbol and the uplink resource, the manners below may be used:

using the uplink resource corresponding to the downlink resource related to the last correctly received indication information ACK in the correctly received indication information ACK successively detected at the PCC, if all the bundling results at the PCC and the SCC are correctly received indication information ACK, or the bundling result at the PCC is correctly received indication information ACK and the bundling result at the SCC is not correctly received indication information NACK/DTX; and using the uplink resource corresponding to the downlink resource related to the last correctly received indication information ACK in the correctly received indication information ACK successively detected at the SCC, if the bundling result at the PCC is not correctly received indication information NACK/DTX and the bundling result at the SCC is correctly received indication information ACK.

In this embodiment, the range of values of DAI may be 0-3. When the range of values of DAI is 0-3, the following steps may be included before step 4304:

Judging whether the last downlink assignment indicator DAI value detected at the SCC is less than 3; and determining the used modulation symbol according to the last downlink assignment indicator DAI value detected at the SCC and the preset mapping relation between a downlink assignment indicator DAI value, the bundling result at the secondary component carrier and the modulation symbol, if the determined result is less than 3.

Furthermore, if it is determined that the last downlink assignment indicator DAI value detected at the SCC is 3, the following steps may be included:

determining the used modulation symbol according to the downlink assignment indicator DAI values and the bundling results at the PCC and the preset mapping relation between a downlink assignment indicator DAI value, the bundling result at the PCC, the bundling result at the SCC and the modulation symbol;

and in such a case, in step 4305, in determining the uplink resource for transmitting the modulation symbol according to the bundling result and the mapping relation between a preset bundling result and the modulation symbol and the uplink resource, the manners below may be used:

using the uplink resource corresponding to the downlink resource related to the last correctly received indication information in the correctly received indication information successively detected at the SCC if the bundling result at the PCC is not correctly received indication information NACK/DTX and the bundling result at the SCC is correctly received indication information ACK, with the corresponding modulation symbol being different from the corresponding modulation symbol when the last downlink assignment indicator DAI value detected at the SCC is less than 3.

In this embodiment, the above mapping relation may be configured in advance and stored in a UE by using a mapping relations table.

In this embodiment, the BS may transmit the downlink data in a transmission block in a downlink subframe on the PCC and SCC.

In such a case, in step 4301, the UE may receive downlink data in turn transmitted by the BS at downlink subframes; in step 4302, the UE detects the downlink data to obtain detection results and DAI values, and allocates corresponding uplink resources; wherein the number of the detection results obtained by detecting the downlink data transmitted by each downlink subframe is 1, and the manner of allocating uplink resources as described in the Background Art or Embodiment 1 is used, which shall not be described any further; in step 4303, the UE performs time domain bundling to the detection results obtained on the PCC and SCC, respectively; wherein the following manner may be used in the time domain bundling: performing "AND" operation on the detection results (ACK/NACK/DTX) to which each downlink subframe in the same CC corresponds, and if all the detection results on the same CC are ACK, the result of time domain bundling is ACK, otherwise, the result of time domain bundling is NACK; in steps 4304-4306, the used modulation symbol and used uplink resource are determined according to a present mapping relation, and then a modulation symbol is transmitted on the determined uplink resource.

Furthermore, in this embodiment, the BS may transmit downlink data via two transmission blocks in a downlink subframe, each of the transmission blocks corresponding to one of two code words.

Figure 49:
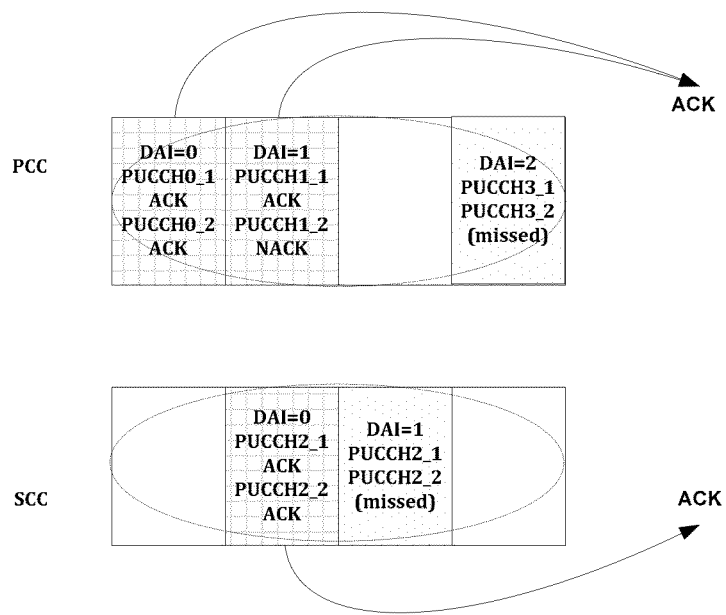
FIG. 49 is a schematic diagram of application example 4 of embodiment 10 of the present invention.

In such a case, in step 4301, the UE may receive downlink data in turn transmitted by the BS at downlink subframes;

in step 4302, the UE detects the downlink data to obtain detection results and DAI values, and allocated uplink resources; wherein the number of the DAI values to which each subframe corresponds is 1, and the number of the detection results obtained by detecting the downlink data transmitted by two transmission blocks in each downlink subframe is 2; and each detection result corresponds to an uplink resource, that is, the number of the uplink resources is 2 (the uplink resources may be obtained in an explicit or implicit manner);

in step 4303, the UE performs time domain bundling to the detection results obtained on the PCC and SCC, respectively; wherein the following manner may be used in the time domain bundling:

performing spatial bundling on the detection results of the two code words to which each downlink subframe corresponds, so as to obtain a result of bundling to which each downlink subframe corresponds; and the manner below may be used in the spatial bundling:

if all the detection results to which the two code words in a downlink subframe correspond are ACK, performing "AND" operation, with the obtained result of bundling being ACK;

if the detection result to which a first one of the two code words in a downlink subframe corresponds is ACK and the other detection result is NACK, determining whether the result of bundling in a downlink subframe preceding the downlink subframe is ACK; and if positive, the obtained result of bundling is ACK, as shown in FIG. 49; otherwise, the obtained result of bundling is NACK;

if all the detection results to which the two code words in a downlink subframe correspond are NACK, the result of bundling is NACK;

then performing "AND" operation on the detection results (ACK/NACK/DTX) to which each downlink subframe in the same CC corresponds, and if all the detection results on the same CC are ACK, the result of time domain bundling is ACK, otherwise, the result of time domain bundling is NACK; for example, as shown in FIG. 49, the results of bundling of time domain bundling on the PCC and SCC are ACK, ACK;

in step 4304, determining used modulation symbol according to the last DAI value detected at the SCC and a mapping relation between a preset downlink assignment indicator DAI value, the bundling result at the SCC and the modulation symbol; or determining the used modulation symbol according to the DAI value corresponding to the last correctly received ACK in the correctly received ACK successively detected at the SCC and the mapping relation between a preset downlink assignment indicator DAI value, the bundling result at the SCC and the modulation symbol;

for example, as shown in FIG. 49, if the last DAI value detected at the SCC is 0, or the DAI to which the last ACK in successive ACK starting with DAI=0 is 0, and the result of bundling on the SCC is ACK, a QPSK symbol is determined by using a corresponding mapping relation according to (DAI=0, ACK);

in step 4305, the case of determining the uplink resource for transmitting the modulation symbol according to the obtained bundling result and the mapping relation between a preset bundling result and the modulation symbol and the uplink resource is similar to that in which the BS transmit downlink data via one transmission block, which shall be described below in brief:

the detection results obtained by detecting on the PCC and SCC are arranged according to DAI values, respectively; thus, there are two detection results corresponding to each DAI value, and each detection result corresponds to an uplink resource PUCCH;

and if the corresponding uplink resources on the PCC are used, then the PUCCH to which the last correctly received indication information in the correctly received indication information starting with DAI=0 is used, as shown in FIG. 49, the PUCCH_1 is as the PUCCH, indicating that the downlink data to which the first code word with DAI=1 on the PCC and all the following code words correspond are correctly received by the UE; and if the corresponding uplink resources on the SCC are used, then the PUCCH to which the last correctly received indication information in the correctly received indication information starting with DAI=0 is used, as shown in FIG. 49, the PUCCH_2 is as the PUCCH, indicating that the downlink data to which the second code word with DAI=0 on the SCC and all the following code words correspond are correctly received by the UE.

It can be seen from the above embodiment that the problem of miss detection of the last PDCCH in time domain bundling may be known according to a preset mapping relation and the detection results.

Embodiment 8

Figure 44:
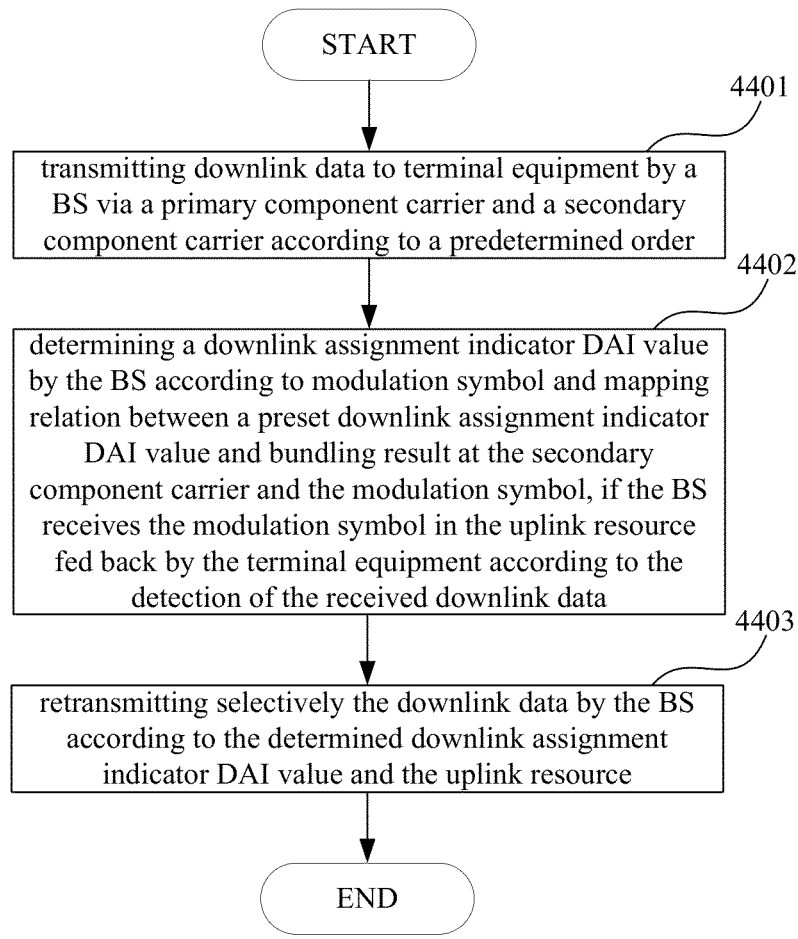
FIG. 44 is a flowchart of the method for transmitting uplink response signal of embodiment 8 of the present invention.

An embodiment of the present invention provides a method for transmitting uplink response signal. As shown in FIG. 44, the method comprises:

step 4401: transmitting downlink data to a terminal equipment by a BS via a primary component carrier and a secondary component carrier in a predetermined order;

step 4402: determining a downlink assignment indicator DAI value by the BS according to a modulation symbol and mapping relation between a preset downlink assignment indicator DAI value and bundling result at the secondary component carrier and the modulation symbol, if the BS receives the modulation symbol in the uplink resource fed back by the terminal equipment according to the detection of the received downlink data;

wherein the downlink assignment indicator DAI value represents the last downlink assignment indicator DAI value detected by the terminal equipment at the secondary component carrier, or represents the downlink assignment indicator DAI value corresponding to the last correctly received indication information in the correctly received indication information successively detected by the terminal equipment at the secondary component carrier; and the uplink resource represents the uplink resource corresponding to the last correctly received indication information in the correctly received indication information successively detected at the primary component carrier or the secondary component carrier;

and wherein the above mapping relation may be configured in advance and stored in the BS by using a mapping relations table, and the particular meaning expressed by the uplink resource may be negotiated by the BS and the UE in advance; and step 4403: retransmitting selectively the downlink data by the BS according to the determined downlink assignment indicator DAI value and the uplink resource.

In this embodiment, when the uplink resource is the uplink resource corresponding to the last correctly received indication information in the correctly received indication information successively detected at the secondary component carrier, the method further comprises:

determining the downlink assignment indicator DAI value by the BS according to the uplink resource, the modulation symbol, and the mapping relation between a preset downlink assignment indicator DAI value and the bundling result at the secondary component carrier and the modulation symbol, if it is determined that the uplink resources corresponding to the downlink data received at the secondary component carrier are different.

It can be seen from the above embodiment that the problem of miss detection of the last PDCCH in time domain bundling may be known by the BS according to the received modulation symbol and a preset mapping relation.

In this embodiment, the respective numbers of the primary component carriers and the secondary component carriers are 1; however, it is not limited thereto, the number of the secondary component carriers may be greater than 1, and different mapping relations tables are used when numbers of component carriers are different. Following description is given taking the number of the secondary component carriers being 1 as an example.

Application Example 1

Mapping relations tables 3 and 4 are preset; wherein Table 3 shows mapping relations between downlink assignment indicator DAI values, bundling results at the secondary component carrier and modulation symbols, and Table 4 shows mapping relations between preset bundling results, modulation symbols and uplink resources.

The mapping relations tables 3 and 4 are stored in the UE, mapping relations table 3 is stored in the BS, and the particular meanings expressed by the uplink resources may be negotiated by the BS and the UE.

TABLE 3

| QPSK constellation points | Bundling results on the SCC and the DAI value in the last detected PDCCH |
|---|---|
| (0, 0) | NACK, any DAI value |
| (0, 1) | ACK, DAI = 0 or DAI = 3 |
| (1, 0) | ACK, DAI = 1 |
| (1, 1) | ACK, DAI = 2 |

TABLE 4

| Bundling results | | QPSK symbols | Resources |
|---|---|---|---|
| A | A | (0, 1) (1, 0) (1, 1) | PUCCH of PCC |
| A | N/D | (0, 0) | PUCCH of PCC |
| N/D | A | (0, 1) (1, 0) (1, 1) | PUCCH of SCC |
| N/D | N/D | NA | NA |

In this embodiment, in step 4304, in determining used modulation symbol according to the last downlink assignment indicator DAI value detected at the secondary component carrier and a mapping relation between a preset downlink assignment indicator DAI value, the bundling result at the secondary component carrier and the modulation symbol, the mapping relations shown in Table 3 may be used.

As shown in Table 3, when the bundling result on the SCC is ACK and DAI=0 or DAI=3, it corresponds to modulation symbol (0, 1); when the bundling result on the SCC is ACK and DAI=1, it corresponds to modulation symbol (1, 0); when the bundling result on the SCC is ACK and DAI=2, it corresponds to modulation symbol (1, 1); and when the bundling result on the SCC is NACK and DAI is any value, it corresponds to modulation symbol (0, 0).

And in step 4305, in determining the uplink resource for transmitting the modulation symbol according to the obtained bundling result and the mapping relation between a preset bundling result and the modulation symbol and the uplink resource, the mapping relations shown in Table 4 may be used.

As shown in Table 4, if all the bundling results on the PCC and SCC are correctly received indication information ACK, or the bundling results on the PCC are correctly received indication information ACK and the bundling results on the SCC are not correctly received indication information NACK/DTX, the uplink resource to which the last correctly received indication information ACK in the correctly received indication information ACK successively detected on the PCC corresponds is used; in this embodiment, in a case where all the bundling results are ACK, the modulation symbols that may be used comprise (0, 1), (1, 0) and (1, 1); and in a case where the bundling results are ACK and NACK/DTX, the modulation symbol (0, 0) may be used.

If the bundling results on the PCC are not correctly received indication information NACK/DTX and the bundling results on the SCC are correctly received indication information ACK, the uplink resource to which the last correctly received indication information ACK in the correctly received indication information ACK successively detected on the SCC corresponds is used; in this embodiment, the modulation symbols that may be used comprise (0, 1), (1, 0) and (1, 1).

If all the bundling results on the PCC and SCC are not correctly received indication information NACK/DTX, no resource is used, and no information is fed back.

In the above embodiment, the meanings expressed by the modulation symbols in Tables 3 and 4 may be set as required, and Tables 3 and 4 are embodiments only.

The method for transmitting uplink response signal is described below taking the scenario shown in FIG. 45 as an example. As shown in FIG. 45, on the PCC, the bundling result obtained after time domain bundling is ACK; and on the SCC, the bundling result obtained after time domain bundling is ACK, and the last downlink assignment indicator DAI detected on the SCC is 1.

Thus, Table 3 may be looked up according to the bundling result ACK on the SCC and DAI=1, so as to obtain a corresponding modulation symbol (1, 0). And Table 4 may be looked up according to the bundling results (ACK ACK) on the PCC and SCC, so as to obtain the used uplink resource. As shown in Table 4, the uplink resource is a PUCCH on the PCC, that is, an uplink resource to which the last correctly received indication information ACK in the ACK successively detected on the PCC. As shown in FIG. 44, the uplink resource is PUCCH1.

In this way, the UE transmits the modulation symbol (1, 0) on the PUCCH1, and when the BS receives the modulation symbol (1, 0) on the uplink resource PUCCH1, it may obtain that the last downlink assignment indicator DAI detected on the SCC is 1, and as the BS knows that the DAI on the SCC is 2, it may know, according to DAI=1 obtained by looking up the tables, that the UE missed in detection of the last downlink data on the SCC. Furthermore, the BS may know, according to the uplink resource for transmitting the modulation symbol, that on the PCC, the downlink data to which the indication information starting from the last correctly received indication information ACK and ending with the last correctly received indication information ACK in the correctly received indication successively detected in the backward direction corresponds are correctly received by the UE, and the BS also knows that such data that have been correctly received need not to be retransmitted, and retransmits the rest of the data.

Figure 6:
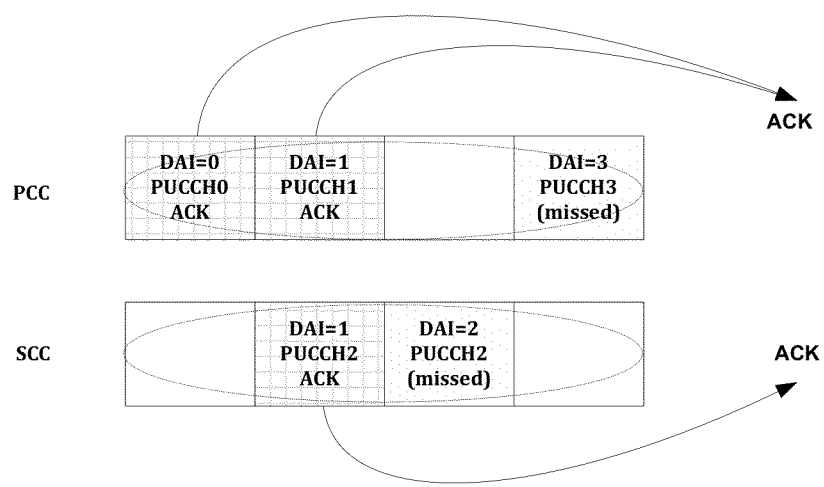
FIG. 6 is a schematic diagram showing the occurrence of missed detection in time domain bundling.

The method for transmitting uplink response signal is described below taking the scenario shown in FIG. 6 as an example. As shown in FIG. 6, on the PCC, the bundling result obtained after time domain bundling is ACK; and on the SCC, the bundling result obtained after time domain bundling is ACK, and the last downlink assignment indicator DAI detected on the SCC is 0.

Thus, Table 3 may be looked up according to the bundling result ACK on the SCC and DAI=0, so as to obtain a corresponding modulation symbol (0, 1). And Table 4 may be looked up according to the bundling results (ACK ACK) on the PCC and SCC, so as to obtain the used uplink resource. As shown in Table 4, the uplink resource is a PUCCH on the PCC, that is, an uplink resource to which the last successively correctly received indication information ACK in the ACK successively detected on the PCC. As shown in FIG. 45, the uplink resource is PUCCH1.

In this way, the UE transmits the modulation symbol (0, 1) on the PUCCH1, and the BS may look up Table 3 when receiving the modulation symbol (0, 1) on the PUCCH1. As the BS transmits four PDSCHs, the possibility of receiving only the first PDSCH is very low, the modulation symbol (0, 1) may be used to denote DAI=0 and DAI=3. Table 4 may be looked up for obtaining the uplink resource, in a manner as described above, which shall not be described any further.

Furthermore, in order to avoid a case of confusion of DAI=0 and DAI=3, the BS may be limited to transmit not more than three downlink data to the UE. Hence, a case of DAI=3 shall not occur, thereby avoiding the above problem of low possibility.

Application Example 2

Mapping relations tables 5 and 6 are preset; wherein Table 5 shows mapping relations between downlink assignment indicator DAI values, bundling results at the secondary component carrier and modulation symbols, and Table 6 shows mapping relations between preset bundling results, modulation symbols and uplink resources.

TABLE 5

| QPSK constellation points | Bundling results on the SCC and the DAI value in the last detected PDCCH |
|---|---|
| (0, 0) | (NACK, any DAI value), or (ACK, DAI = 3, and when the bundling result on the PCC is NACK/DTX) |
| (0, 1) | ACK, DAI = 0, or (ACK, DAI = 3, and when the bundling result on the PCC is ACK) |
| (1, 0) | ACK, DAI = 1 |
| (1, 1) | ACK, DAI = 2 |

TABLE 6

| Results obtained by bundling | | QPSK symbols | Feedback resources |
|---|---|---|---|
| A | A | (0, 1) (1, 0) (1, 1) | PUCCH of PCC |
| A | N/D | (0, 0) | PUCCH of PCC |
| N/D | A* | (0, 1) (1, 0) (1, 1) | PUCCH of SCC |
| N/D | A** | (0, 0) | PUCCH of SCC |
| N/D | N/D | NA | NA |

As shown in Table 6, A** denotes the ACK obtained in time domain bundling when the DAI that is last detected on the SCC is 3, and A* denotes the ACK obtained in time domain bundling when the DAI that is last detected on the SCC is not 3.

As shown in Table 6, if the bundling result on the PCC is not correctly received indication information NACK/DTX and the bundling result on the SCC is correctly received indication information A**/A*, the uplink resource to which the last correctly received indication information in the correctly received indication information successively detected on the SCC is used, and the modulation symbol to which A** corresponds and the modulation symbol to which A* corresponds are different.

In Application example 1, one state is not used, that is, the PUCCH on the SCC does not transmit (0, 0), in Application example 2, the PUCCH on the SCC may be used to inform the case that the DAI that is last detected on the SCC is 3, and the case that the PUCCH on the SCC is used only when the bundling result on the PCC is NACK/DTX is taken into consideration, which corresponds to the case sharing a part of ambiguities between DAI=0 and DAI=3 by using the PUCCH on the SCC to transmit (0, 0).

It can be seen from the above embodiment that when the range of the downlink assignment indicator DAI values is in 0-3, when the UE determines that the last downlink assignment indicator DAI value detected on the SCC is less than 3, in step 4304, the modulation symbol may be obtained according to the last downlink assignment indicator DAI value detected on the SCC and Table 5. In step 4305, the uplink resource for transmitting the modulation symbol may be obtained according to the bundling result and Table 6. The case is similar to that of Example 1, which shall not be described any further.

When it is determined that the last downlink assignment indicator DAI value detected on the SCC is equal to 3, in step 4304, the modulation symbol may be obtained according to the downlink assignment indicator DAI value, the bundling result on the PCC and Table 5. And in step 4305, the uplink resource for transmitting the modulation symbol may be obtained according to the bundling result and Table 6.

Application Example 3

Mapping relations tables 7 and 8 are preset; wherein Table 7 shows mapping relations between downlink assignment indicator DAI values, bundling results at the secondary component carrier and modulation symbols, and Table 8 shows mapping relations between preset bundling results, modulation symbols and uplink resources. Wherein, the QPSK modulation symbols denote the downlink assignment indicator DAI value to which the last correctly received indication information ACK in the correctly received indication information ACK successively detected on the SCC.

TABLE 7

| QPSK constellation points | Bundling results on the SCC and the DAI value in the last detected PDCCH |
|---|---|
| (0, 0) | NACK, any DAI value |
| (0, 1) | ACK, DAI = 0 or DAI = 3 |
| (1, 0) | ACK, DAI = 1 |
| (1, 1) | ACK, DAI = 2 |

TABLE 8

| Bundling results | | QPSK symbols | Resources |
|---|---|---|---|
| A | A | (0, 1) (1, 0) (1, 1) | PUCCH of PCC |
| A | N/D | (0, 0) | PUCCH of PCC |
| N/D | A | (0, 1) (1, 0) (1, 1) | PUCCH of SCC |
| N/D | N/D | NA | NA |

Performing bundling on the SCC and looking up the Tables by the UE may be in a manner as follows:

In a case wherein ACK is detected on a first physical position that is capable of transmitting:

1. if NACK/DTX is detected on other physical positions, the bundling result is NACK, and Table 7 is looked up according to the NACK; otherwise, the bundling result is ACK, and Table 7 is looked up according to (ACK, DAI=0);

2. if ACK is detected on other physical positions, 1) as shown in FIGS. 48A-48D, if there are successive 1, 2, 3, 4 correctly detected PDSCHs starting from DAI=0, Table 7 is looked up according to the last correctly detected DAI value, so as to determine the QPSK modulation symbol that is fed back; otherwise, NACK is fed back, and Table 7 is looked up according to the NACK.

The uplink resources for transmitting the modulation symbols may determined by using the methods as described in application examples 1 and 2, which shall not described any further.

When the UE transmits the modulation symbol to the BS on the determined uplink resource, the BS may look up Table 7, comprising the cases as follows:
- if (0, 0) is received, the BS knows that all that are transmitted on the SCC are wrong, and retransmits all the downlink data;
- if (0, 1) is received, the BS transmits four downlink data, then the BS knows that all the four downlink data are correctly received by the UE; otherwise, the BS knows that the downlink data to which the PDCCH with DAI=0 corresponds is correctly received; and
- if (1, 0) or (1, 1) is received, the BS knows that the former two or three transmitted downlink data are correctly received by the UE.

In this application example, the method for obtaining the modulation symbols and the uplink resources for transmitting the modulation symbols by looking up Tables 7 and 8 is similar to above application examples, which shall not described any further.

Furthermore, in this embodiment, 5 or 9 downlink subframes correspond to one uplink subframe for TDD configuration. If above methods are adopted, one UE is confined to be scheduled only 3 or 4 times, a normal TDD configuration is transformed, then the above methods are adopted for later processing.

Furthermore, in this embodiment, if the PUCCHs to which the PDSCHs of the SCC correspond use different resources, when the bundling result on the PCC is NACK and the bundling result on the SCC is ACK, different PUCCHs to which the SCC corresponds may be used to feed back the QPSK modulation symbols to the BS. And the BS may jointly determine the last detected DAI value according to the positions of the PUCCHs and the values of the QPSK.

It can be seen from the above embodiment that the BS may obtain corresponding modulation symbols and uplink resources for transmitting the modulation symbols according to the preset mapping relation and the detection results, so that the BS may know the problem of miss detection of the last PDSCH in time domain bundling after receiving the modulation symbol.

It should be understood by those skilled in the art that all or part of the steps in the methods of embodiments 7 and 8 may be implemented by related hardware instructed by a program, and the program may be stored in a computer-readable storage medium. In executing the program, all or part of the steps in the methods of the above embodiments may be included, and the storage medium may comprise an ROM, an RAM, a floppy disk, and a compact disk, etc.

An embodiment of the present invention provides also a BS and a terminal equipment as described below. As the principles of the BS and the terminal equipment for solving problems are similar to those of the method for transmitting uplink response signal based on a BS and a terminal equipment as described above, the implementation of the method may be referred to for the implementation of the BS and terminal equipment, and the repeated parts shall not be described further. Wherein, the terminal equipment may be a UE.

Embodiment 9

Figure 46:
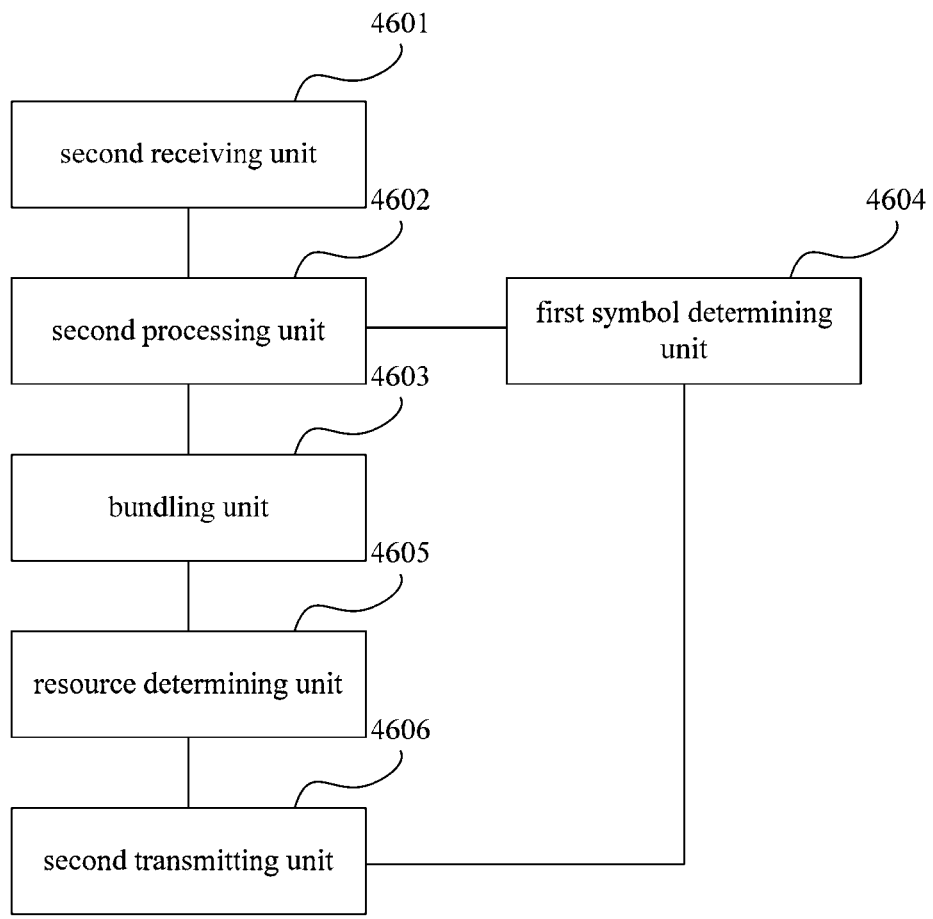
FIG. 46 is a schematic diagram of the structure of the terminal equipment of embodiment 9 of the present invention.

An embodiment of the present invention provides a terminal equipment. As shown in FIG. 46, the terminal equipment comprises:

- a second receiving unit 4601 for receiving downlink data transmitted by a BS via a primary component carrier and a secondary component carrier in a predetermined order;
- a second processing unit 4602 for detecting the downlink data received by the second receiving unit 4601 to obtain indication information on correctly receiving the downlink data, wrongly receiving the downlink data, or no control information being received, and to obtain a downlink assignment indicator DAI value indicative of the order of transmitting the downlink data at the primary component carrier and the secondary component carrier;
- a bundling unit 4603 for performing time domain bundling to the results of detecting at the primary component carrier and the secondary component carrier, respectively;
- a first symbol determining unit 4604 for determining used modulation symbol according to the last downlink assignment indicator DAI value detected at the secondary component carrier and a mapping relation between a preset downlink assignment indicator DAI value and the bundling result at the secondary component carrier and the modulation symbol; or for determining the used modulation symbol according to the last downlink assignment indicator DAI value corresponding to the last correctly received indication information in the correctly received indication information successively detected at the secondary component carrier and the mapping relation between a preset downlink assignment indicator DAI value and the bundling result at the secondary component carrier and the modulation symbol;
- a resource determining unit 4605 for determining the uplink resource for transmitting the modulation symbol according to the bundling result obtained by the bundling unit and the mapping relation between a preset bundling result and the modulation symbol and the uplink resource; the uplink resource representing the uplink resource corresponding to the last correctly received indication information in the correctly received indication information successively detected at the primary component carrier or the secondary component carrier; and
- a second transmitting unit 4606 for transmitting the modulation symbol to the base station in the determined uplink resource, such that the base station retransmits selectively the downlink data according to the modulation symbol received at the uplink resource.

In this embodiment, the resource determining unit 4605 comprises:
- a first resource determining unit (not shown) for using the uplink resource corresponding to the last correctly received indication information in the correctly received indication information successively detected at the primary component carrier when all the bundling results at the primary component carrier and the secondary component carrier are correctly received indication information, or the bundling result at the primary component carrier is correctly received indication information and the bundling result at the secondary component carrier is not correctly received indication information; and
- a second resource determining unit (not shown) for using the uplink resource corresponding to the last correctly received indication information in the correctly received indication information successively detected at the secondary component carrier when the bundling result at the primary component carrier is not correctly received indication information and the bundling result at the secondary component carrier is correctly received indication information.

Furthermore, the terminal equipment comprises: a first indication value determination unit (not shown) for determining whether the last downlink assignment indicator DAI value detected at the secondary component carrier is less than 3 before the symbol determining unit determines the used modulation symbol according to the last downlink assignment indicator DAI value detected at the secondary component carrier and the mapping relation between a preset downlink assignment indicator DAI value and the bundling result at the secondary component carrier and the modulation symbol;

and the first symbol determining unit 4606 is also used for determining the used modulation symbol according to the last downlink assignment indicator DAI value detected at the secondary component carrier and the mapping relation between a preset downlink assignment indicator DAI value, the bundling result at the secondary component carrier and the modulation symbol when the determined result of the first indication value determination unit is less than 3.

Furthermore, the terminal equipment comprises:

a second symbol determining unit (not shown) for determining the used modulation symbol according to the downlink assignment indicator DAI value and the bundling result at the primary component carrier and the mapping relation between a preset downlink assignment indicator DAI value, the bundling result at the primary component carrier, the bundling result at the secondary component carrier and the modulation symbol when the result determined by the first indication value determining unit is 3;

and the resource determining unit 4605 comprises a third resource determining unit for using the uplink resource corresponding to the last correctly received indication information in the correctly received indication information successively detected at the secondary component carrier when the bundling result at the primary component carrier is not correctly received indication information and the bundling result at the secondary component carrier is correctly received indication information, with the corresponding modulation symbol being different from the corresponding modulation symbol when the last downlink assignment indicator DAI value detected at the secondary component carrier is less than 3.

The mapping relations used by the terminal equipment may be the mapping relations shown in Tables 4-8, which shall not be described any further.

It can be seen from the above embodiment that the BS may obtain corresponding modulation symbols and uplink resources for transmitting the modulation symbols according to the preset mapping relation and the detection results, so that the BS may know the problem of miss detection of the last PDCCH in time domain bundling after receiving the modulation symbol.

Embodiment 10

Figure 47:
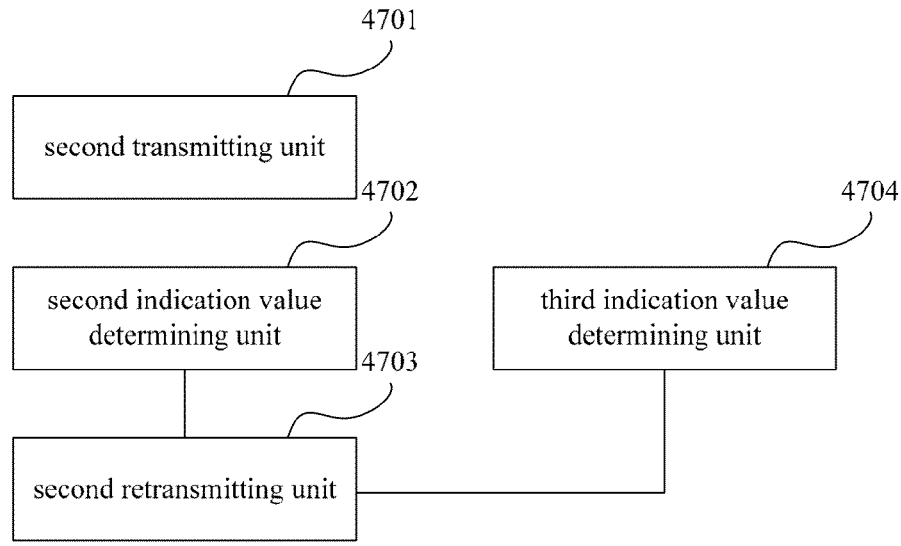
FIG. 47 is a schematic diagram of the structure of the BS of embodiment 10 of the present invention.
Figure 48A:
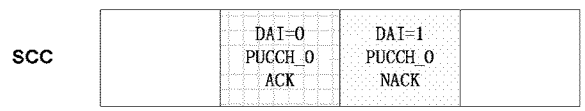
FIGS. 48A, 48B, 48C and 48D are schematic diagrams of application example 3 of embodiment 10 of the present invention.
Figure 48B:
Figure 48C:
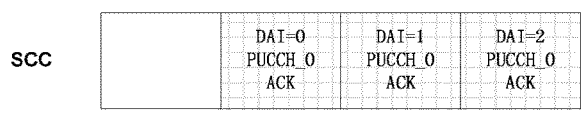
Figure 48D:

An embodiment of the present invention provides a BS. As shown in FIG. 47, the BS comprises:

a second transmitting unit 4701 for transmitting downlink data to terminal equipment via a primary component carrier and a secondary component carrier in a predetermined order;

a second indication value determining unit 4702 for determining a downlink assignment indicator DAI value according to a modulation symbol and mapping relation between a preset downlink assignment indicator DAI value and bundling result at the secondary component carrier and the modulation symbol when the modulation symbol fed back by the terminal equipment according to the detection of the received downlink data is received in the uplink resource;

wherein the downlink assignment indicator DAI value represents the last downlink assignment indicator DAI value detected by the terminal equipment at the secondary component carrier, or represents the downlink assignment indicator DAI value corresponding to the last correctly received indication information in the correctly received indication information successively detected by the terminal equipment at the secondary component carrier; and the uplink resource represents the uplink resource corresponding to the last correctly received indication information in the correctly received indication information successively detected at the primary component carrier or the secondary component carrier; and a second retransmitting unit 4703 for retransmitting selectively the downlink data according to the downlink assignment indicator DAI value determined by the second indication value determining unit 4702 and the uplink resource.

In this embodiment, as shown in FIG. 47, the BS further comprises a third indication value determining unit 4704 for determining the downlink assignment indicator DAI value according to the uplink resource, the modulation symbol and the mapping relation between a preset downlink assignment indicator DAI value and the bundling result at the secondary component carrier and the modulation symbol, when the uplink resource is the uplink resource corresponding to the last correctly received indication information in the correctly received indication information successively detected at the secondary component carrier, and the uplink resource corresponding to the downlink data received at the secondary component carrier is different.

And the second retransmitting unit 4703 is further used for retransmitting selectively downlink data according to the downlink assignment indicator DAI value determined by the third indication value determining unit 4704 and the uplink resource.

In this embodiment, both the terminal equipment and the BS may comprise a storage unit for storing a related mapping relations table.

It can be seen from the above embodiment that the BS may determine the problem of miss detection of the last PDCCH according to the modulation symbols received on the uplink resources, and determine the downlink data needing to be retransmitted.

Embodiment 11

An embodiment of the present invention provides a communication system, comprising:

a BS, comprising the BS as described in Embodiment 10; and a terminal equipment, comprising the terminal equipment as described in Embodiment 9.

An embodiment of the present invention also provides a computer-readable program, wherein when the program is executed in a BS, the program enables a computer to execute the method for transmitting uplink response signal as Embodiment 5, or to execute the method for transmitting uplink response signal as Embodiment 10, in the BS.

An embodiment of the present invention also provides a computer-readable program, wherein when the program is executed in a BS, the program enables a computer to execute the method for transmitting uplink response signal as described in Embodiment 2 or 8 in the BS.

An embodiment of the present invention also provides a storage medium in which a computer-readable program is stored, wherein the computer-readable program enables a computer to execute the method for transmitting uplink response signal as described in Embodiment 2 or 8 in a BS.

An embodiment of the present invention also provides a computer-readable program, wherein when the program is executed in a terminal equipment, the program enables a computer to execute the method for transmitting uplink response signal as described in Embodiment 1 or 3 in the terminal equipment.

An embodiment of the present invention also provides a storage medium in which a computer-readable program is stored, wherein the computer-readable program enables a computer to execute the method for transmitting uplink response signal as described in Embodiment 1 or 3 in a terminal equipment.

The above devices and methods of the present invention may be implemented by hardware, and may also be implemented by hardware in combination with software. The present invention relates to such a computer-readable program that when the program is executed by a logic component, it enables the logic component to implement the devices or constitutional parts as described above, or enables the logic component to implement the methods or steps as described above. The present invention relates also to a storage medium for storing the above program, such as a hard disk, a floppy disk, a CD, and flash memory, etc.

The present invention are described above in conjunction with the embodiments, however, it will be apparent to those skilled in the art that such description is exemplary only and is not limitative to the protection scope of the present invention. Various variations and modifications may be made by those skilled in the art without departing from the spirits and principle of the present invention, which will fall within the protection scope of the present invention.

What is claimed is:

1. A method for transmitting uplink response signal, comprising:
   receiving downlink data transmitted by a base station via a primary component carrier and a secondary component carrier in a predetermined order;
   detecting the received downlink data to obtain indication information on correctly receiving the downlink data, wrongly receiving the downlink data, or no control information being received, and to allocate corresponding uplink resources according to the primary component carrier and secondary component carrier where the detected downlink data is present;
   arranging the indication information obtained through detecting according to the predetermined order of transmitting the downlink data by the base station to obtain an indication information sequence;
   generating an uplink response signal according to the indication information in the indication information sequence obtained at the corresponding secondary component carrier and a position and number of the correctly received indication information in the indication information sequence, and determining the uplink resources used to feed back the uplink response signal; and
   transmitting the uplink response signal to the base station by using the determined uplink resources, such that the base station determines the downlink data needing to be retransmitted according to the uplink response signal fed back in the uplink resources, wherein the generating an uplink response signal and determining the uplink resources used to feed back the uplink response signals comprise:
   determining the number of correctly received indication information in the indication information sequence obtained through detecting at the secondary component carrier; and
   generating an uplink response signal according to the position and number of the correctly received indication information in the indication information sequence if it is determined that the number of correctly received indication information obtained through detecting at the secondary component carrier is 1, and determining the uplink resources used to feed back the uplink response signals.

2. The method according to claim 1, wherein if it is determined that the number of the indication information obtained through detecting at the secondary component carrier is greater than 1, the method further comprises:
   generating an uplink response signal according to the position and number of the correctly received indication information in the indication information sequence if it is determined that the uplink resources allocated at the secondary component carrier are different, and determining the uplink resources used to feed back the uplink response signal.

3. The method according to claim 2, wherein a direction from a first piece of indication information to the last piece of indication information in the indication information sequence represents a forward direction, and the direction opposite to it represents a backward direction;
   the generating an uplink response signal according to the position and number of the correctly received indication information in the indication information sequence and determining the uplink resources used to feed back the uplink response signals comprise:
   generating a first indication signal when it is determined that the indication information sequence starts with the correctly received indication information and the correctly received indication information at a starting position is one obtained through detecting first downlink data transmitted by the base station, the first indication signal being the uplink response signal; wherein the first indication signal represents that the downlink data is correctly received which is related to N1 pieces of successively correctly received indication information starting with the correctly received indication information at the starting position and ending with the last correctly received indication information in the forward direction, with N1 being a positive integer greater than or equal to 1; and
   determining that feeding back the first indication signal in the uplink resource corresponding to the last correctly received indication information in the forward direction.

4. The method according to claim 1, wherein a direction from a first piece of indication information to the last piece of indication information in the indication information sequence represents a forward direction, and the direction opposite to it represents a backward direction;
   the generating an uplink response signal according to the position and number of the correctly received indication information in the indication information sequence and determining the uplink resources used to feed back the uplink response signals comprise:

generating a second indication signal when the indication information sequence ends with the correctly received indication information and an ending position is the position of the last downlink resource capable of transmitting downlink data in the downlink resources of the primary component carrier and the secondary component carrier, the second indication signal being the uplink response signal; wherein the second indication signal represents that the downlink data is correctly received which is related to M1 pieces of successively correctly received indication information starting with the correctly received indication information at the ending position and ending with the last correctly received indication information in the backward direction, with M1 being a positive integer greater than or equal to 1; and determining that feeding back the second indication signal in the uplink resource corresponding to the last correctly received indication information in the backward direction.

5. The method according to claim 1, wherein a direction from a first piece of indication information to the last piece of indication information in the indication information sequence represents a forward direction, and the direction opposite to it represents a backward direction;

the generating an uplink response signal according to the position and number of the correctly received indication information in the indication information sequence and determining the uplink resources used to feed back the uplink response signals comprise:

when the indication information sequence starts with the correctly received indication information and the correctly received indication information at a starting position is one obtained through detecting first downlink data transmitted by the base station, and ends with the correctly received indication information and an ending position is the position of the last downlink resource capable of transmitting downlink data in the downlink resources of the primary component carrier and the secondary component carrier, determining whether a first number of successively correctly received indication information in the forward direction starting from the correctly received indication information at the starting position is greater than or equal to a second number of successively correctly received indication information in the backward direction starting from the correctly received indication information at the ending position;

generating a third indication signal if it is determined that the first number is greater than or equal to the second number, with the third indication signal being the uplink response signal; wherein the third indication signal represents that the downlink data is correctly received which is related to N2 pieces of successively correctly received indication information starting with the correctly received indication information at the starting position and ending with the last correctly received indication information in the forward direction, with N2 being a positive integer greater than or equal to 1;

determining to feed back the third indication signal in the uplink resource corresponding to the last correctly received indication information in the forward direction; and generating a fourth indication signal if it is determined that the first number is less than the second number, with the fourth indication signal being the uplink response signal; wherein the fourth indication signal represents that the downlink data is correctly received which is related to M2 pieces of successively correctly received indication information starting with the correctly received indication information at the ending position and ending with the last correctly received indication information in the backward direction, with M2 being a positive integer greater than or equal to 1;

determining to feed back the fourth indication signal in the uplink resource corresponding to the last correctly received indication information in the backward direction.

6. The method according to claim 2, wherein if it is determined that the uplink resources allocated at the secondary component carrier are identical, generate uplink response signal according to the indication information obtained through detecting at the secondary component carrier and the position and number of the correctly received indication information in the indication information sequence, and determine the uplink resources used to feed back the uplink response signal.

7. The method according to claim 6, wherein a direction from a first piece of indication information to the last piece of indication information in the indication information sequence represents a forward direction, and the direction opposite to it represents a backward direction;

the generating an uplink response signal according to the indication information obtained through detecting at the secondary component carrier and the position and number of the correctly received indication information in the indication information sequence and determining the uplink resources used to feed back the uplink response signal comprise:

feeding back the uplink response signal in the uplink resources being allocated at the secondary component carrier when the indication information sequence starts with the correctly received indication information and the correctly received indication information at a starting position is one obtained through detecting first downlink data transmitted by the base station, and detection results obtained through detecting the downlink data at the secondary component carrier are all correctly received indication information; otherwise, feeding back the uplink response signal in the uplink resource corresponding to the last piece of correctly received indication information in successively correctly received indication information in the forward direction starting with a first correctly received indication information prior to the secondary component carrier; and feeding back the uplink response signal in the uplink resources being allocated at the secondary component carrier when the indication information sequence ends with the correctly received indication information and the detection results obtained through detecting the downlink data at the secondary component carrier are all correctly received indication information; otherwise, feeding back the uplink response signal in the uplink resource corresponding to the last piece of correctly received indication information in the successively correctly received indication information in the backward direction starting with the correctly received indication information at an ending position after the secondary component carrier.

8. The method according to claim 1, wherein a direction from a first piece of indication information to the last piece of indication information in the indication information sequence represents a forward direction, and the direction opposite to it represents a backward direction;

the generating an uplink response signal according to the position and number of the correctly received indication information in the indication information sequence and determining the uplink resources used to feed back the uplink response signal comprise:

generating a fifth indication signal if it is determined that the correctly received indication information is at a position immediately before an ending position when the indication information sequence does not start with the correctly received indication information and does not end with the correctly received indication information, with the fifth indication signal being the uplink response signal; wherein the ending position is the position of the last downlink resource capable of transmitting downlink data in the downlink resources of the primary component carrier and the secondary component carrier; the fifth indication signal represents that the downlink data is correctly received which is related to M3 pieces of successively correctly received indication information starting with the correctly received indication information at the position immediately before the ending position and ending with the last correctly received indication information in the backward direction, with M3 being a positive integer greater than or equal to 1; and determining that feeding back the fifth indication signal in the uplink resource corresponding to the last correctly received indication information in the backward direction;

generating a sixth indication signal if it is determined that the correctly received indication information is at a position secondarily before the ending position, with the sixth indication signal being the uplink response signal; wherein the ending position is the position of the last downlink resource capable of transmitting downlink data in the downlink resources of the primary component carrier and the secondary component carrier; the sixth indication signal represents that the downlink data is correctly received which is related to M4 pieces of successively correctly received indication information starting with the correctly received indication information at the position secondarily before the ending position and ending with the last correctly received indication information in the backward direction, with M4 being a positive integer greater than or equal to 1; and determining that feeding back the sixth indication signal in the uplink resource corresponding to the last correctly received indication information in the backward direction.

9. A method for transmitting uplink response signal, comprising:

transmitting downlink data by a base station via a primary component carrier and a secondary component carrier to terminal equipment in a predetermined order;

retransmitting selectively the downlink data by the base station according to an uplink response signal feeding back an uplink resource if the base station receives the uplink response signal fed back through an indication information sequence in the uplink resource, the indication information sequence is obtained through the terminal equipment detecting the downlink data transmitted by the base station, and the indication information sequence containing indication information on correctly receiving the downlink data, wrongly receiving the downlink data, or no control information being received; and retransmitting all the downlink data by the base station if the base station receives no uplink response signal fed back by the terminal equipment;

wherein the uplink resource is determined by:

determining a number of the indication information in the indication information sequence obtained through detecting at the secondary component carrier by the terminal equipment; and generating the uplink response signal according to a position and number of the correctly received indication information in the indication information sequence if it is determined that the number of the indication information obtained through detecting at the secondary component carrier is 1, and determining the uplink resources used to feed back the uplink response signals.

10. The method according to claim 9, wherein a direction from a first piece of indication information to the last piece of indication information in the indication information sequence represents a forward direction, and the direction opposite to it represents a backward direction;

the retransmitting all the downlink data by the base station comprising:

determining whether the received uplink response signal is a correctly received indication signal in the forward direction or a correctly received indication signal in the backward direction; wherein the correctly received indication signal in the forward direction represents that the downlink data is correctly received which is related to S1 pieces of successively correctly received indication information starting with the correctly received indication information at the start of the indication information sequence and ending with the last indication information correctly received in the forward direction; and the correctly received indication signal in the backward direction represents that the downlink data is correctly received which is related to S2 pieces of successive correctly received indication information starting with the indication information at an ending position in the indication information sequence and ending with the last indication information correctly received in the backward direction; wherein S1 and S2 are integers greater than or equal to 1;

determining the downlink data correctly received by the terminal equipment according to the received uplink response signal and the uplink resource for transmitting the uplink response signal; and retransmitting other downlink data than that in the downlink data transmitted by the base station determined to be correctly received by the terminal equipment.

11. The method according to claim 9, wherein the determining the downlink data correctly received by the terminal equipment according to the received uplink response signal and the uplink resource for transmitting the uplink response signal comprises:

determining that all the downlink data transmitted in a downlink resource corresponding to the uplink resource for transmitting the uplink response signal and the downlink data transmitted in S1 pieces of successive downlink resources following the downlink resource are correctly received by the terminal equipment, when it is determined that the forward correctly received indication signal fed back by the terminal equipment is received in the uplink resource; wherein the forward correctly received indication signal represents that the downlink data is correctly received which is related to S1 pieces of successive correctly received indication information starting with the correctly received indication information at the start of the indication information sequence and ending with the last indication information correctly received in the forward direction;

determining that all the downlink data transmitted in the downlink resource corresponding to the uplink resource for transmitting the indication signal in the backward direction and the downlink data transmitted in S2 pieces of successive downlink resources preceding the downlink resource are correctly received by the terminal equipment, when the base station receives in the uplink resource the backward correctly received indication signal fed back by the terminal equipment; wherein the backward correctly received indication signal represents that the downlink data is correctly received which is related to S2 pieces of successive correctly received indication information starting with the indication information at an ending position in the indication information sequence and ending with the last indication information correctly received in the backward direction; and wherein S1 and S2 are integers greater than or equal to 1.

12. A terminal equipment, comprising:

a first receiver for receiving downlink data transmitted by a base station via a primary component carrier and a secondary component carrier in a predetermined order;

a first processor for detecting the downlink data received by the first receiver to obtain indication information on correctly receiving the downlink data, wrongly receiving the downlink data, or no control information being received, and to allocate corresponding uplink resources according to the primary component carrier and secondary component carrier where the detected downlink data is present;

an arranging processor for arranging the indication information obtained through detecting by the first processor according to the predetermined order of transmitting the downlink data by the base station to obtain an indication information sequence;

a signal generating and resource determining processor for generating an uplink response signal according to the indication information in the indication information sequence obtained at the corresponding secondary component carrier and a position and number of the correctly received indication information in the indication information sequence, and for determining the uplink resources used to feed back the uplink response signal; and a signal transmitter for transmitting the uplink response signal to the base station by using the uplink resources determined by the signal generating and resource determining processor, such that the base station determines the downlink data needing to be retransmitted according to the uplink response signal fed back in the uplink resources, wherein the signal generating and resource determining processor comprises:

a first determining processor for determining the number of the indication information in the indication information sequence obtained through detecting at the secondary component carrier; and a first signal generating and resource determining processor for generating an uplink response signal according to the position and number of the correctly received indication information in the indication information sequence when it is determined by the first determining processor that the number of the indication information obtained through detecting at the secondary component carrier is 1, and for determining the uplink resources used to feed back the uplink response signals.

13. The terminal equipment according to claim 12, wherein the signal generating and resource determining processor further comprises:

a second determining processor for further determining whether the uplink resources allocated at the secondary component carrier are identical when a result determined by the first determining processor is that the number of the indication information obtained through detecting at the secondary component carrier is greater than 1; and a second signal generating and resource determining processor for generating an uplink response signal according to the position and number of the correctly received indication information in the indication information sequence when a result determined by the second determining processor is that the uplink resources allocated at the secondary component carrier are different, and for determining the uplink resources used to feed back the uplink response signals.

14. The terminal equipment according to claim 13, wherein the signal generating and resource determining processor further comprises:

a third signal generating and resource determining processor for generating an uplink response signal according to the indication information obtained through detecting at the secondary component carrier and the position and number of the correctly received indication information in the indication information sequence when the result determined by the second determining processor is that the uplink resources allocated at the secondary component carrier are identical, and for determining the uplink resources used to feed back the uplink response signals.

15. A base station, comprising:

a transmitter for transmitting downlink data to terminal equipment via a primary component carrier and a secondary component carrier in a predetermined order;

a third determining processor for determining whether an uplink response signal fed back through an indication information sequence is received in an uplink resource, the indication information sequence is obtained through the terminal equipment detecting the downlink data transmitted by the transmitter, and the indication information sequence containing indication information on correctly receiving the downlink data, wrongly receiving the downlink data, or no control information being received; and a retransmitter for retransmitting selectively the downlink data according to the uplink response signals fed back in the uplink resource when it is determined by the third determining processor that the uplink response signals are received in the uplink resource, wherein the uplink resource is determined by:

determining a number of the indication information in the indication information sequence obtained through detecting at the secondary component carrier by the terminal equipment; and generating the uplink response signal according to a position and number of the correctly received indication information in the indication information sequence if it is determined that the number of the indication information obtained through detecting at the secondary component carrier is 1, and determining the uplink resources used to feed back the uplink response signals.

16. The base station according to claim 15, wherein a direction from a first piece of indication information to the last piece of indication information in the indication information sequence represents a forward direction, and the direction opposite to it represents a backward direction;

the retransmitter comprising:

a signal type determining processor for determining whether the received uplink response signal is a correctly received indication signal in the forward direction or in the backward direction; wherein the correctly received indication signal in the forward direction represents that the downlink data is correctly received which is related to S1 pieces of successive correctly received indication information starting with the correctly received indication information at the start of the indication information sequence and ending with the last indication information correctly received in the forward direction;

and the correctly received indication signal in the backward direction represents that the downlink data is correctly received which is related to S2 pieces of successive correctly received indication information starting with the indication information at an ending position in the indication information sequence and ending with the last indication information correctly received in the backward direction; wherein S1 and S2 are integers greater than or equal to 1;

a correctly receiving data determining processor for determining the downlink data correctly received by the terminal equipment according to the received uplink response signal and the uplink resource for transmitting the uplink response signal; and a data retransmitter for retransmitting other downlink data than that correctly received by the terminal equipment determined by the correctly receiving data determining processor among the downlink data transmitted by the transmitter;

wherein the correctly received indication information at the start of the indication information sequence refers to the correctly received indication information obtained through detecting the first downlink data transmitted by the base station; and the ending position is the position of the last downlink resource capable of transmitting downlink data in the downlink resources of the primary component carrier and the secondary component carrier.

17. The base station according to claim 16, wherein the correctly receiving data determining processor comprises:

a fourth determining processor for determining that all the downlink data transmitted in the downlink resource corresponding to the uplink resource for transmitting the uplink response signal and the downlink data transmitted in S1 pieces of successive downlink resources following the downlink resource are correctly received by the terminal equipment, when it is determined by the signal type determining unit processor that the forward correctly received indication signal fed back by the terminal equipment is received in the uplink resource; wherein the forward correctly received indication signal represents that the downlink data is correctly received which is related to S1 pieces of successive correctly received indication information starting with the correctly received indication information at the start of the indication information sequence and ending with the last indication information correctly received in the forward direction; and a fifth determining processor for determining that all the downlink data transmitted in the downlink resource corresponding to the uplink resource for transmitting the indication signal in the backward direction and the downlink data transmitted in S2 pieces of successive downlink resources preceding the downlink resource are correctly received by the terminal equipment, when the base station receives in the uplink resource the backward correctly received indication signal fed back by the terminal equipment; wherein the backward correctly received indication signal represents that the downlink data is correctly received which is related to S2 pieces of successive correctly received indication information starting with the indication information at the ending position in the indication information sequence and ending with the last indication information correctly received in the backward direction; wherein S1 and S2 are integers greater than or equal to 1.

18. A method for transmitting uplink response signal, comprising:

receiving downlink data transmitted by a base station via a primary component carrier and a secondary component carrier in a predetermined order;

detecting the received downlink data to obtain indication information on correctly receiving the downlink data, wrongly receiving the downlink data, or no control information being received, and downlink assignment indicator DAI values indicative of the order of the downlink data transmitted at the primary component carrier and the secondary component carrier;

performing time domain bundling on the detection results at the primary component carrier and the secondary component carrier, respectively;

determining used modulation symbol according to a last downlink assignment indicator DAI value detected at the secondary component carrier and a mapping relation between a preset downlink assignment indicator DAI value, a bundling result at the secondary component carrier and the modulation symbol; or determining the used modulation symbol according to the last downlink assignment indicator DAI value corresponding to the last correctly received indication information in the correctly received indication information successively detected at the secondary component carrier and the mapping relation between a preset downlink assignment indicator DAI value, the bundling result at the secondary component carrier and the modulation symbol;

determining an uplink resource for transmitting the modulation symbol according to the obtained bundling result and the mapping relation between a preset bundling result and the modulation symbol and the uplink resource; the uplink resource representing the uplink resource corresponding to the last correctly received indication information in the correctly received indication information successively detected at the primary component carrier or the secondary component carrier; and transmitting the modulation symbol in the determined uplink resource to the base station, such that the base station retransmits selectively the downlink data according to the modulation symbol received in the uplink resource, wherein before the determining the used modulation symbol according to the last downlink assignment indicator DAI value detected at the secondary component carrier and the mapping relation between a preset downlink assignment indicator DAI value, the bundling result at the secondary component carrier and the modulation symbol, the method further comprises:

determining whether the last downlink assignment indicator DAI value detected at the secondary component carrier is less than 3 when the downlink assignment indicator DAI values range from 0-3; and determining the used modulation symbol according to the last downlink assignment indicator DAI value detected at the secondary component carrier and the mapping relation between a preset downlink assignment indicator DAI value, the bundling result at the secondary component carrier and the modulation symbol, if the determined result is less than 3.

19. The method according to claim 18, wherein a number of the primary component carrier and the secondary component carrier is 1.

20. The method according to claim 18, wherein a number of the downlink data transmitted by the base station is not greater than 3.

21. The method according to claim 18, wherein the determining the uplink resource for transmitting the determined modulation symbol according to the bundling result and the mapping relation between a preset bundling result and the modulation symbol and the uplink resource comprises:

using the uplink resource corresponding to the last correctly received indication information in the correctly received indication information successively detected at the primary component carrier, if all the bundling results at the primary component carrier and the secondary component carrier are correctly received indication information, or the bundling result at the primary component carrier is correctly received indication information and the bundling result at the secondary component carrier is not correctly received indication information; and using the uplink resource corresponding to the last correctly received indication information in the correctly received indication information successively detected at the secondary component carrier, if the bundling result at the primary component carrier is not correctly received indication information and the bundling result at the secondary component carrier is correctly received indication information.

22. The method according to claim 18, wherein if it is determined that the last downlink assignment indicator DAI value detected at the secondary component carrier is 3, the method further comprises:

determining the used modulation symbol according to the downlink assignment indicator DAI values and the bundling results at the primary component carrier and the mapping relation between a preset downlink assignment indicator DAI value, the bundling result at the primary component carrier, the bundling result at the secondary component carrier and the modulation symbol; and the determining the uplink resource for transmitting the modulation symbol according to the bundling result and the mapping relation between a preset bundling result and the modulation symbol and the uplink resource comprises:

using the uplink resource corresponding to the last correctly received indication information in the correctly received indication information successively detected at the secondary component carrier if the bundling result at the primary component carrier is not correctly received indication information and the bundling result at the secondary component carrier is correctly received indication information, with the corresponding modulation symbol being different from the corresponding modulation symbol when the last downlink assignment indicator DAI value detected at the secondary component carrier is less than 3.

23. A method for transmitting uplink response signal, comprising:

transmitting downlink data to terminal equipment by a base station via a primary component carrier and a secondary component carrier in a predetermined order;

determining a downlink assignment indicator DAI value by the base station according to a modulation symbol and mapping relation between a preset downlink assignment indicator DAI value and a bundling result at the secondary component carrier and the modulation symbol, if the base station receives the modulation symbol in an uplink resource fed back by the terminal equipment according to detection of received downlink data;

wherein the downlink assignment indicator DAI value represents a last downlink assignment indicator DAI value detected by the terminal equipment at the secondary component carrier, or represents the downlink assignment indicator DAI value corresponding to the last correctly received indication information in the correctly received indication information successively detected by the terminal equipment at the secondary component carrier; and the uplink resource represents the uplink resource corresponding to the last correctly received indication information in the correctly received indication information successively detected at the primary component carrier or the secondary component carrier; and retransmitting selectively the downlink data by the base station according to the determined downlink assignment indicator DAI value and the uplink resource, wherein the used modulation symbol is determined by:

determining whether the last downlink assignment indicator DAI value detected at the secondary component carrier is less than 3 when the downlink assignment indicator DAI values range from 0-3 by the terminal equipment; and determining the used modulation symbol according to the last downlink assignment indicator DAI value detected at the secondary component carrier and the mapping relation between a preset downlink assignment indicator DAI value, the bundling result at the secondary component carrier and the modulation symbol, if the determined result is less than 3.

24. The method according to claim 23, wherein when the uplink resource is the uplink resource corresponding to the last correctly received indication information in the correctly received indication information successively detected at the secondary component carrier, the method further comprises:

determining the downlink assignment indicator DAI value by the base station according to the uplink resource, the modulation symbol, and the mapping relation between a preset downlink assignment indicator DAI value and the bundling result at the secondary component carrier and the modulation symbol, if it is determined that the uplink resources corresponding to the downlink data received at the secondary component carrier are different.

25. A terminal equipment, comprising:

a receiver for receiving downlink data transmitted by a base station via a primary component carrier and a secondary component carrier in a predetermined order;

a second processor for detecting the downlink data received by the receiver to obtain indication information on correctly receiving the downlink data, wrongly receiving the downlink data, or no control information being received, and to obtain a downlink assignment indicator DAI value indicative of the order of transmitting the downlink data at the primary component carrier and the secondary component carrier;
a bundling processor for performing time domain bundling to the results of detecting at the primary component carrier and the secondary component carrier, respectively;
a first symbol determining processor for determining used modulation symbol according to a last downlink assignment indicator DAI value detected at the secondary component carrier and a mapping relation between a preset downlink assignment indicator DAI value and a bundling result at the secondary component carrier and the modulation symbol; or for determining the used modulation symbol according to the last downlink assignment indicator DAI value corresponding to the last correctly received indication information in the correctly received indication information successively detected at the secondary component carrier and the mapping relation between a preset downlink assignment indicator DAI value and the bundling result at the secondary component carrier and the modulation symbol;
a resource determining processor for determining an uplink resource for transmitting the modulation symbol according to the bundling result obtained by the bundling processor and the mapping relation between a preset bundling result and the modulation symbol and the uplink resource; the uplink resource representing the uplink resource corresponding to the last correctly received indication information in the correctly received indication information successively detected at the primary component carrier or the secondary component carrier; and
a transmitter for transmitting the modulation symbol to the base station in the determined uplink resource, such that the base station retransmits selectively the downlink data according to the modulation symbol received at the uplink resource,
wherein the terminal equipment further comprises:
a first indication value determination processor for determining whether the last downlink assignment indicator DAI value detected at the secondary component carrier is less than 3 before the symbol determining processor determines the used modulation symbol according to the last downlink assignment indicator DAI value detected at the secondary component carrier and the mapping relation between a preset downlink assignment indicator DAI value and the bundling result at the secondary component carrier and the modulation symbol; and
the first symbol determining processor is also used for determining the used modulation symbol according to the last downlink assignment indicator DAI value detected at the secondary component carrier and the mapping relation between a preset downlink assignment indicator DAI value, the bundling result at the secondary component carrier and the modulation symbol when the determined result of the first indication value determination processor is less than 3.

26. The terminal equipment according to claim 25, wherein the resource determining processor comprises:
a first resource determining processor for using the uplink resource corresponding to the last correctly received indication information in the correctly received indication information successively detected at the primary component carrier when all the bundling results at the primary component carrier and the secondary component carrier are correctly received indication information, or the bundling result at the primary component carrier is correctly received indication information and the bundling result at the secondary component carrier is not correctly received indication information; and
a second resource determining processor for using the uplink resource corresponding to the last correctly received indication information in the correctly received indication information successively detected at the secondary component carrier when the bundling result at the primary component carrier is not correctly received indication information and the bundling result at the secondary component carrier is correctly received indication information.

27. The terminal equipment according to claim 25, wherein the terminal equipment further comprises:
a second symbol determining processor for determining the used modulation symbol according to the downlink assignment indicator DAI value and the bundling result at the primary component carrier and the mapping relation between a preset downlink assignment indicator DAI value, the bundling result at the primary component carrier, the bundling result at the secondary component carrier and the modulation symbol when the result determined by the first indication value determining processor is 3; and
the resource determining processor comprises a third resource determining processor for using the uplink resource corresponding to the last correctly received indication information in the correctly received indication information successively detected at the secondary component carrier when the bundling result at the primary component carrier is not correctly received indication information and the bundling result at the secondary component carrier is correctly received indication information, with the corresponding modulation symbol being different from the corresponding modulation symbol when the last downlink assignment indicator DAI value detected at the secondary component carrier is less than 3.

28. A base station, comprising:
a transmitter for transmitting downlink data to terminal equipment via a primary component carrier and a secondary component carrier in a predetermined order;
a second indication value determining processor for determining a downlink assignment indicator DAI value according to a modulation symbol and mapping relation between a preset downlink assignment indicator DAI value and a bundling result at the secondary component carrier and the modulation symbol when the modulation symbol fed back by the terminal equipment according to detection of received downlink data is received in an uplink resource;
wherein the downlink assignment indicator DAI value represents a last downlink assignment indicator DAI value detected by the terminal equipment at the secondary component carrier, or represents the downlink assignment indicator DAI value corresponding to the last correctly received indication information in the correctly received indication information successively detected by the terminal equipment at the secondary component carrier; and the uplink resource represents the uplink resource corresponding to the last correctly received indication information in the correctly received indication information successively detected at the primary component carrier or the secondary component carrier; and
a retransmitter for retransmitting selectively the downlink data according to the downlink assignment indicator DAI value determined by the second indication value determining processor and the uplink resource, wherein the used modulation symbol is determined by:
determining whether the last downlink assignment indicator DAI value detected at the secondary component carrier is less than 3 when the downlink assignment indicator DAI values range from 0-3 by the terminal equipment; and determining the used modulation symbol according to the last downlink assignment indicator DAI value detected at the secondary component carrier and the mapping relation between a preset downlink assignment indicator DAI value, the bundling result at the secondary component carrier and the modulation symbol, if the determined result is less than 3.

29. The base station according to claim 28, wherein the base station further comprises a third indication value determining processor for determining the downlink assignment indicator DAI value according to the uplink resource, the modulation symbol and the mapping relation between a preset downlink assignment indicator DAI value and the bundling result at the secondary component carrier and the modulation symbol, when the uplink resource is the uplink resource corresponding to the last correctly received indication information in the correctly received indication information successively detected at the secondary component carrier, and the uplink resource corresponding to the downlink data received at the secondary component carrier is different.

30. A non-transitory storage medium in which a computer-readable program is stored, wherein when the program is executed in a base station, the program enables a computer to execute the method for transmitting uplink response signal as claimed in claim 9, in the base station.

31. A non-transitory storage medium in which a computer-readable program is stored, wherein the computer-readable program enables a computer to execute the method for transmitting uplink response signal as claimed in claim 23, in a base station.

32. A non-transitory storage medium in which a computer-readable program is stored, wherein when the program is executed in terminal equipment, the program enables a computer to execute the method for transmitting uplink response signal as claimed in claim 1, in the terminal equipment.

33. A non-transitory storage medium in which a computer-readable program is stored, wherein the computer-readable program enables a computer to execute the method for transmitting uplink response signal as claimed in claim 18, in terminal equipment.

34. A terminal equipment, comprising:
a memory configured to store a plurality of instructions;
a processor coupled to the memory and configured to execute the instructions to:
control a receiver to receive downlink data transmitted by a base station via a primary component carrier and a secondary component carrier in a predetermined order;
detect the received downlink data to obtain indication information on correctly receiving the downlink data, wrongly receiving the downlink data, or no control information being received, and allocate corresponding uplink resources according to the primary component carrier and secondary component carrier where the detected downlink data is present;
arrange the indication information obtained through detecting according to the predetermined order of transmitting the downlink data by the base station to obtain an indication information sequence;

generate an uplink response signal according to the indication information in the indication information sequence obtained at the corresponding secondary component carrier and a position and number of the correctly received indication information in the indication information sequence, and determine the uplink resources used to feed back the uplink response signal; and control a transmitter to transmit the uplink response signal to the base station by using the determined uplink resources, such that the base station determines the downlink data needing to be retransmitted according to the uplink response signal fed back in the uplink resources, wherein the generating uplink response signal and determining the uplink resources used to feed back the uplink response signals comprise:

determine the number of the correctly received indication information in the indication information sequence obtained through detecting at the secondary component carrier; and generate an uplink response signal according to the position and number of the correctly received indication information in the indication information sequence if it is determined that the number of the indication information obtained through detecting at the secondary component carrier is 1, and determining the uplink resources used to feed back the uplink response signals.

35. A base station, comprising:
a memory configured to store a plurality of instructions;
a processor coupled to the memory and configured to execute the instructions to:
control a transmitter to transmit downlink data by a base station via a primary component carrier and a secondary component carrier to terminal equipment in a predetermined order;
determine whether an uplink response signal fed back through an indication information sequence is received in an uplink resource, the indication information sequence is obtained through the terminal equipment detecting the downlink data transmitted by the transmitter, and the indication information sequence containing indication information on correctly receiving the downlink data, wrongly receiving the downlink data, or no control information being received; and
control the transmitter to retransmit selectively the downlink data according to the uplink response signals fed back in the uplink resource when it is determined by the processor that the uplink response signals are received in the uplink resource;
wherein the uplink resource is determined by:
determine a number of the correctly received indication information in the indication information sequence obtained through detecting at the secondary component carrier by the terminal equipment; and
generate the uplink response signal according to a position and the number of the correctly received indication information in the indication information sequence if it is determined that the number of the indication information obtained through detecting at the secondary component carrier is 1, and determining the uplink resources used to feed back the uplink response signals.

36. A terminal equipment, comprising:
a memory configured to store a plurality of instructions;
a processor coupled to the memory and configured to execute the instructions to:
control a receiver to receive downlink data transmitted by a base station via a primary component carrier and a secondary component carrier in a predetermined order;

detect the downlink data received by the receiver to obtain indication information on correctly receiving the downlink data, wrongly receiving the downlink data, or no control information being received, and obtain a downlink assignment indicator DAI value indicative of the order of transmitting the downlink data at the primary component carrier and the secondary component carrier;

perform time domain bundling to the results of detecting at the primary component carrier and the secondary component carrier, respectively;

determine used modulation symbol according to a last downlink assignment indicator DAI value detected at the secondary component carrier and a mapping relation between a preset downlink assignment indicator DAI value and a bundling result at the secondary component carrier and the modulation symbol; or determine the used modulation symbol according to the last downlink assignment indicator DAI value corresponding to the last correctly received indication information in the correctly received indication information successively detected at the secondary component carrier and the mapping relation between a preset downlink assignment indicator DAI value and the bundling result at the secondary component carrier and the modulation symbol;

determine an uplink resource for transmitting the modulation symbol according to the bundling result obtained by the processor and the mapping relation between a preset bundling result and the modulation symbol and the uplink resource; the uplink resource representing the uplink resource corresponding to the last correctly received indication information in the correctly received indication information successively detected at the primary component carrier or the secondary component carrier; and control the transmitter to transmit the modulation symbol to the base station in the determined uplink resource, such that the base station retransmits selectively the downlink data according to the modulation symbol received at the uplink resource, wherein the processor further configured to execute the instructions to:

determine whether the last downlink assignment indicator DAI value detected at the secondary component carrier is less than 3 before the processor determines the used modulation symbol according to the last downlink assignment indicator DAI value detected at the secondary component carrier and the mapping relation between a preset downlink assignment indicator DAI value and the bundling result at the secondary component carrier and the modulation symbol; and determine the used modulation symbol according to the last downlink assignment indicator DAI value detected at the secondary component carrier and the mapping relation between a preset downlink assignment indicator DAI value, the bundling result at the secondary component carrier and the modulation symbol when the determined result of an indication value determination processor is less than 3.

37. A base station, comprising:

a memory configured to store a plurality of instructions;

a processor coupled to the memory and configured to execute the instructions to:

control a transmitter to transmit downlink data to terminal equipment via a primary component carrier and a secondary component carrier in a predetermined order;

determine a downlink assignment indicator DAI value according to a modulation symbol and mapping relation between a preset downlink assignment indicator DAI value and a bundling result at the secondary component carrier and the modulation symbol when the modulation symbol fed back by the terminal equipment according to detection of received downlink data is received in an uplink resource;

wherein the downlink assignment indicator DAI value represents a last downlink assignment indicator DAI value detected by the terminal equipment at the secondary component carrier, or represents the downlink assignment indicator DAI value corresponding to the last correctly received indication information in the correctly received indication information successively detected by the terminal equipment at the secondary component carrier; and the uplink resource represents the uplink resource corresponding to the last correctly received indication information in the correctly received indication information successively detected at the primary component carrier or the secondary component carrier; and control the transmitter to retransmit selectively the downlink data according to the downlink assignment indicator DAI value determined by the processor and the uplink resource, wherein the used modulation symbol is determined by:

determine whether the last downlink assignment indicator DAI value detected at the secondary component carrier is less than 3 when the downlink assignment indicator DAI values range from 0-3 by the terminal equipment; and determine the used modulation symbol according to the last downlink assignment indicator DAI value detected at the secondary component carrier and the mapping relation between a preset downlink assignment indicator DAI value, the bundling result at the secondary component carrier and the modulation symbol, if the determined result is less than 3.

* * * * *